US012030667B2

(12) United States Patent
Maedler et al.

(10) Patent No.: US 12,030,667 B2
(45) Date of Patent: Jul. 9, 2024

(54) AIRCRAFT REFUELING SYSTEM WITH FLOW BOOSTER AND METHOD OF USING SAME

(71) Applicant: SHELL OIL COMPANY, Houston, TX (US)

(72) Inventors: Bernhard Hans Maedler, Hamburg (DE); Griffin Michael Valentich, Houston, TX (US)

(73) Assignee: SHELL USA, INC., Houston, TX (US)

( * ) Notice: Subject to any disclaimer, the term of this patent is extended or adjusted under 35 U.S.C. 154(b) by 1005 days.

(21) Appl. No.: 16/961,444

(22) PCT Filed: Jan. 8, 2019

(86) PCT No.: PCT/EP2019/050349
§ 371 (c)(1),
(2) Date: Jul. 10, 2020

(87) PCT Pub. No.: WO2019/137919
PCT Pub. Date: Jul. 18, 2019

(65) Prior Publication Data
US 2021/0078728 A1    Mar. 18, 2021

Related U.S. Application Data

(60) Provisional application No. 62/615,458, filed on Jan. 10, 2018.

(51) Int. Cl.
*B64F 1/28*    (2006.01)
*B64D 39/00*    (2006.01)
(Continued)

(52) U.S. Cl.
CPC ............... *B64F 1/28* (2013.01); *B64D 39/00* (2013.01); *B67D 7/3245* (2013.01); *B67D 7/36* (2013.01)

(58) Field of Classification Search
CPC ............ B67D 7/36; B67D 7/3245; B64F 1/28
See application file for complete search history.

(56) References Cited

U.S. PATENT DOCUMENTS 3,286,725 A    11/1966    Elbogen et al.
3,591,050 A    7/1971    Kupersmith et al.
(Continued)

FOREIGN PATENT DOCUMENTS

CN    202098553 U    1/2012
RU    2085446 C1    7/1997
(Continued)

OTHER PUBLICATIONS

International Search Report and Written Opinion received for PCT Patent Application No. PCT/EP2019/050349, mailed on Apr. 8, 2019, 13 pages.
(Continued)

*Primary Examiner* — Jason K Niesz
(74) *Attorney, Agent, or Firm* — SHELL USA, INC.

(57) ABSTRACT

A flow booster for optimizing flow of fuel passing into an aircraft. The flow booster includes a fuel intake fluidly coupled to the fuel circuit, and includes a housing and a piston. The piston has a piston head slidably movable in the housing to define h a variable fuel inlet to receive the fuel. The fuel applies a fuel force to the piston. An intake tuner is operatively connected to the fuel M intake, and has a tuning force applied to the piston against the fuel force. A trigger is coupled to the intake tuner to vary the tuning force applied by the intake tuner. The flow regulator is coupled to sensors to receive fuel measurements. A flow regulator is operatively connected to the trigger to activate the trigger in response to the fuel measurements whereby the flow of the fuel into the aircraft is continuously adjustable during refueling.

11 Claims, 15 Drawing Sheets

(51) Int. Cl.
*B67D 7/32* (2010.01)
*B67D 7/36* (2010.01)

(56) References Cited

U.S. PATENT DOCUMENTS

| | | | |
|---|---|---|---|
| 3,648,720 | A | 3/1972 | Kornahrens |
| 4,452,207 | A | 6/1984 | Moore, Jr. |
| 4,522,237 | A | 6/1985 | Endo et al. |
| 4,934,565 | A | 6/1990 | Heisey et al. |
| 5,660,798 | A | 8/1997 | Doshi et al. |
| 6,324,840 | B1 | 12/2001 | Watkins |
| 6,360,730 | B1 | 3/2002 | Koethe |
| 8,511,351 | B2 | 8/2013 | Watkins et al. |
| 8,720,499 | B2 | 5/2014 | Kastner et al. |
| 2001/0022079 | A1* | 9/2001 | Blot-carretero ...... G05D 7/0146 60/734 |
| 2009/0315729 | A1 | 12/2009 | Inhoffer |
| 2011/0232801 | A1 | 9/2011 | Watkins et al. |
| 2012/0043425 | A1 | 2/2012 | Beck |
| 2016/0016783 | A1 | 1/2016 | Rubin-Ayma et al. |

FOREIGN PATENT DOCUMENTS

| | | |
|---|---|---|
| RU | 2206478 C2 | 6/2003 |
| WO | 2017032917 A1 | 3/2017 |

OTHER PUBLICATIONS

Meggitt Controls: "Spring Set Demand Control Valves", retrieved from the internet: http://www.aljac.com/pdfs/Spring_Set_Demand_Control_Valves.pdf, Aug. 25, 2016, 2 pages, XP055575636.

Office Action Received for Japanese Application No. 2020-537705, Mailed on Oct. 19, 2022, 12 Pages(5 Pages of English Translation and 7 Pages of Official Copy).

Office Action Received for Chinese Application No. 201980008080.6, Mailed on Apr. 29, 2023, 14 Pages (7 Pages of English Translation and 7 Pages of Official Copy).

\* cited by examiner

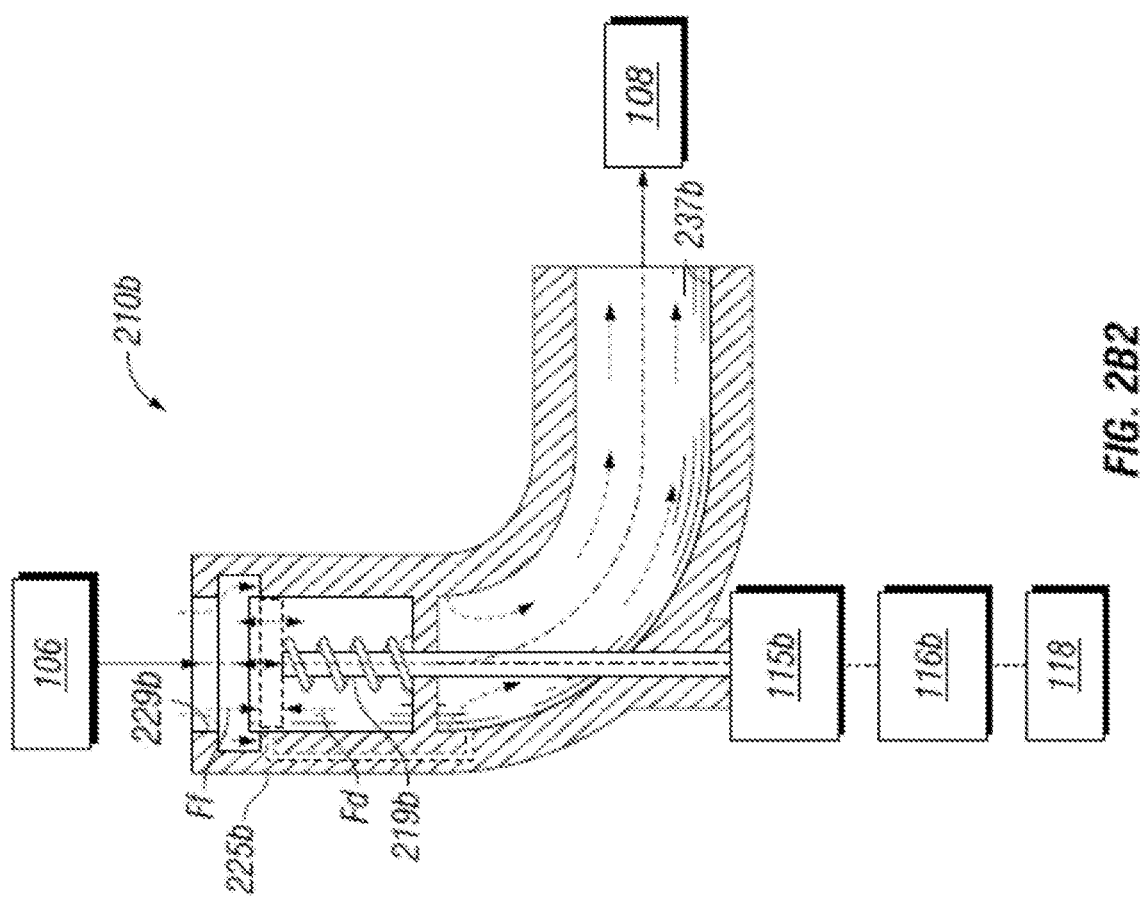
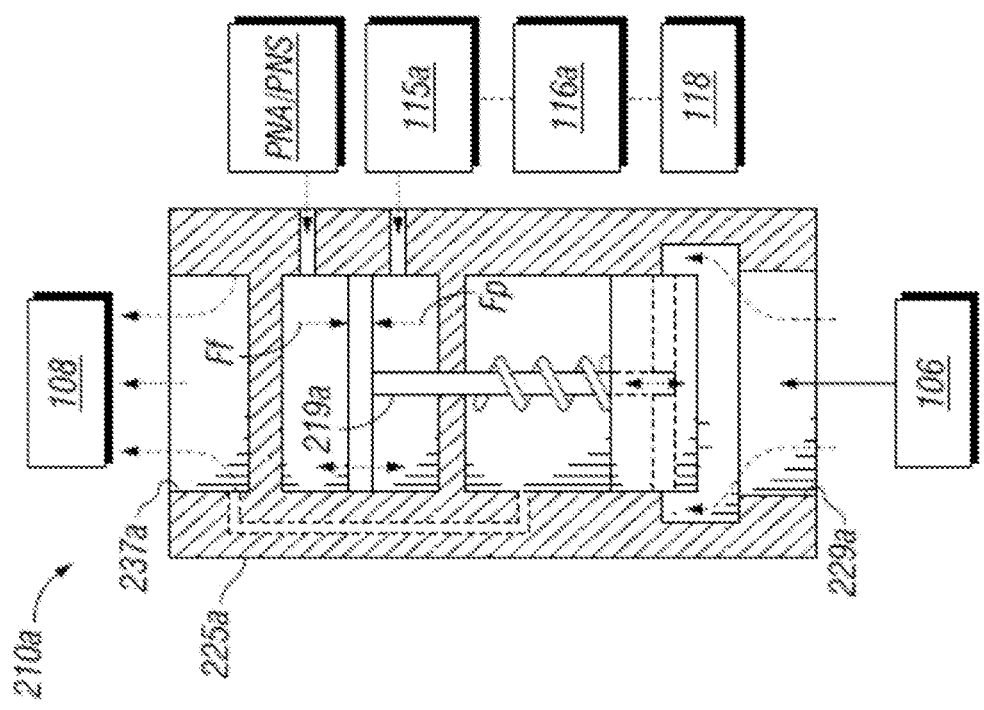
FIG. 2B1
FIG. 2B2

AIRCRAFT REFUELING SYSTEM WITH FLOW BOOSTER AND METHOD OF USING SAME

CROSS REFERENCE TO RELATED APPLICATIONS

This is a national stage application of International Application No. PCT/EP2019/050349, filed Jan. 8, 2019, and claims benefit of US Provisional Application No. 62/615,458, filed Jan. 10, 2018.

BACKGROUND

The present disclosure relates generally to aircraft. More specifically, the present disclosure relates to techniques for fueling (and/or refueling) aircraft.

Various fueling devices, such as the refuelers, the hydrant dispensers, and other fuel units and/or systems, are used to transfer fuel into aircraft to power the aircraft during flight. These fueling devices include, or are connectable to, storage containers containing the fuel (e.g. storage tanks). These storage containers may be positioned above or below the surface for housing the fuel until needed for fueling of the aircraft. These storage containers may be fixed storage tanks, or mobile containers transported by carriers to the aircraft while grounded. Some storage containers may be flown by an airborne fuel aircraft for fueling another aircraft while in flight. Examples of fueling devices are provided in Nos. U.S. Pat. Nos. 8,720,499, 5,660,798, 3,648,720, US2009/0315729, US2012/0043425, the entire contents of which are hereby incorporated by reference herein.

During fueling, the fuel is passed from the storage tank to the aircraft using hoses and other conduits. The hoses may be connected to the storage tanks at one end, and attached to the aircraft at another end. The hoses may have nozzles insertable into a fuel receptacle on the aircraft for passing fuel into fuel tanks in the aircraft. The hoses may be connected to the storage tanks by fuel devices. Examples of such fuel devices are provided in U.S. Pat. Nos. 8,720,499, 8,511,351, 6,360,730, 3,591,050, and 4,452,207, the entire contents of which are hereby incorporated by reference herein.

Despite advances in aircraft fueling techniques, there remains a need for safer and more efficient aircraft fueling operations.

BRIEF DESCRIPTION OF THE DRAWINGS

So that the above recited features and advantages can be understood in detail, a more particular description, briefly summarized above, may be had by reference to the embodiments thereof that are illustrated in the appended drawings. It is to be noted, however, that the examples illustrated are not to be considered limiting of its scope. The figures are not necessarily to scale and certain features and certain views of the figures may be shown exaggerated in scale or in schematic in the interest of clarity and conciseness.

FIGS. 2B1 and 2B2 are schematic diagrams depicting example intakes of the fuel circuit.

SUMMARY

Figure 1:
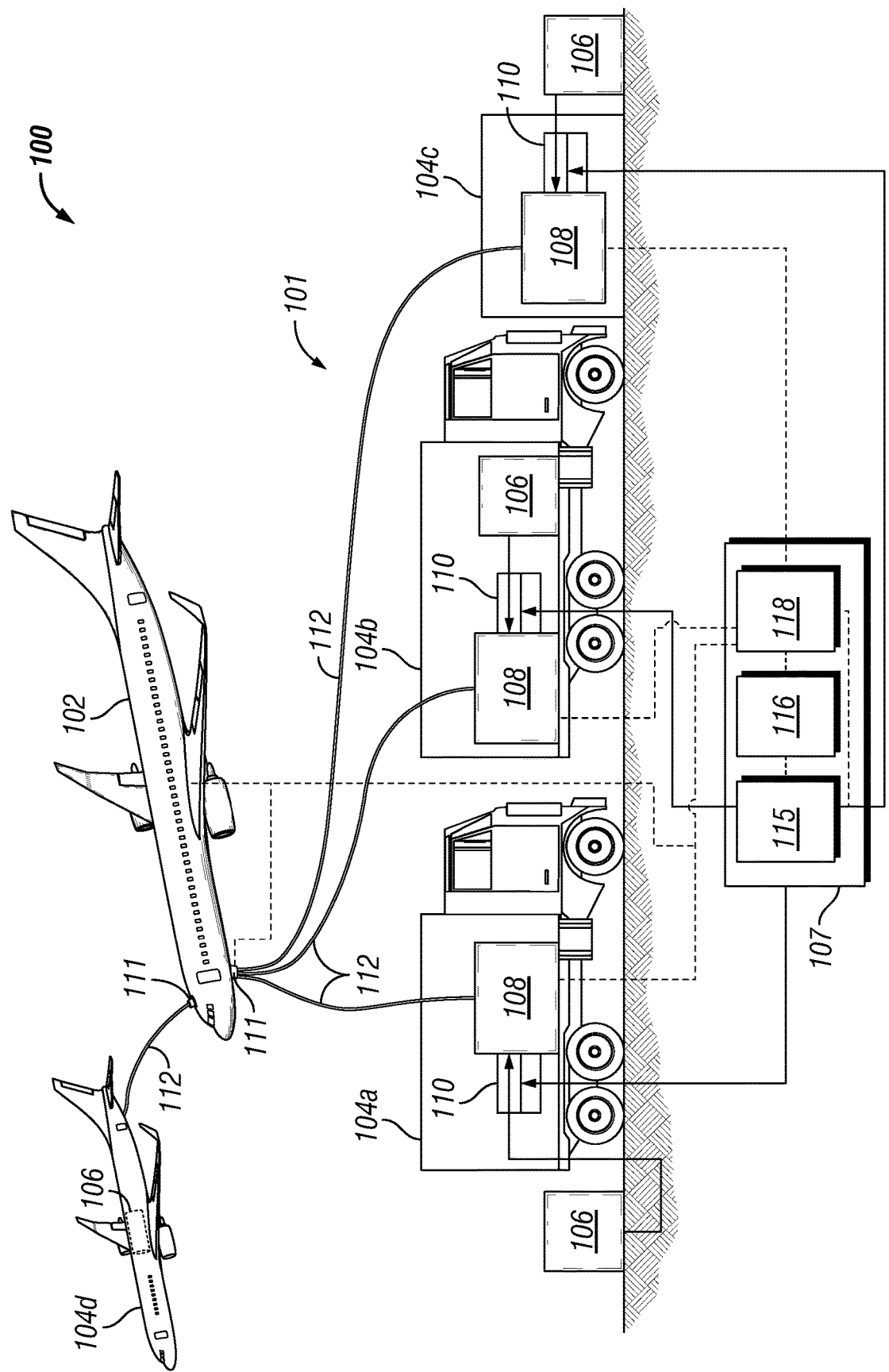
FIG. 1 is a schematic diagram of an aircraft fuel site including a refueling system comprising a flow booster and various refueling units having a fuel circuit.

In at least one aspect, the disclosure relates to a flow booster for optimizing flow of a fuel passing into an aircraft via a refueling unit. The refueling unit comprises a fuel circuit. The flow booster comprises a fuel intake, an intake tuner, a trigger, and a flow regulator. The fuel intake is fluidly coupled to the fuel circuit, and comprises a housing and a piston. The piston comprises a piston head slidably movable in the housing to define a variable fuel inlet to receive the fuel therethrough and into the fuel circuit. The fuel has a fuel force applied to the piston. The intake tuner is operatively connected to the fuel intake, and has a tuning force applied to the piston against the fuel force. The trigger is coupled to the intake tuner to selectively vary the tuning force applied by the intake tuner. The flow regulator is coupled to sensors positioned about the refueling unit to receive fuel measurements therefrom, and is operatively connected to the trigger to selectively activate the trigger in response to the fuel measurements whereby the flow of the fuel into the aircraft is continuously adjustable during refueling.

The piston is urged toward a fully closed position of the fuel inlet when the tuning force exceeds the fuel force and toward a fully open position of the fuel inlet when the fuel force exceeds the tuning force. The fuel force is defined by a fuel pressure of the fuel at the fuel inlet, the fuel circuit, and/or the aircraft. The intake tuner comprises a pressurized fluid source with a pressurized fluid. The fuel force comprises a fuel pressure of the fuel applied to a fuel side of the piston and wherein the tuning force comprises a fluid pressure of the pressurized fluid applied to a fluid side of the piston. The piston further comprises a piston tail connected to the piston head by a piston rod and movable therewith. The piston tail has the fuel side and the fluid side on opposite sides thereof, and separates a piston chamber in the housing into a fuel chamber on the fuel side of the piston tail and a fluid chamber on the fluid side of the piston tail. The fuel chamber is in fluid communication with the fuel and the fluid chamber is in fluid communication with the pressurized fluid.

The intake tuner comprises a motor operatively connected to the piston, and the tuning force is defined by a driving force of the motor. The trigger comprises driver, a solenoid, and/or a valve.

In another aspect, the disclosure relates to a refueling system for optimizing flow of a fuel passing into an aircraft. The refueling system comprises a fuel source, a refueling unit comprising a fuel circuit in selective fluid communication with the fuel source and the aircraft, and a flow booster. The flow booster comprises a fuel intake, an intake tuner, a trigger, and a flow regulator. The fuel intake is fluidly coupled to the fuel circuit, and comprises a housing and a piston. The piston comprises a piston head slidably movable in the housing to define a variable fuel inlet to receive the fuel therethrough and into the fuel circuit. The fuel has a fuel force applied to the piston. The intake tuner is operatively connected to the fuel intake, and has a tuning force applied to the piston against the fuel force. The trigger is coupled to the intake tuner to selectively vary the tuning force applied by the intake tuner. The flow regulator is coupled to sensors positioned about the refueling unit to receive fuel measurements therefrom, and is operatively connected to the trigger to selectively activate the trigger in response to the fuel measurements whereby the flow of the fuel into the aircraft is continuously adjustable during refueling.

The sensors comprise fluid pressure (Pfluid), fuel pressure (Pfuel), intake pressure (Pintake), fuel flow rate (Qfuel), simulated nozzle pressure (PNS), actual nozzle pressure (PNA), and backpressure at the aircraft (Pplane) sensors. The refueling unit comprises a hydrant dispenser or a refueler.

Finally, in another aspect, the disclosure relates to a method of optimizing flow of a fuel into an aircraft. The method comprises passing the fuel through a fuel intake and into a fuel circuit and from the fuel circuit into the aircraft, defining a dimension of a fuel inlet of the fuel intake by slidably positioning a piston in the fuel inlet and applying a fuel force of the fuel to the piston, measuring fuel parameters of the fuel during the passing, and during the passing and based on the measuring, selectively boosting the flow of the fuel into the aircraft by selectively applying a tuning force against the fuel force such that a dimension of the fuel inlet of the fuel intake is varied.

The selectively boosting comprises maintaining a pressure of the fuel below a maximum pressure during the passing and/or selectively increasing the tuning force to overcome the fuel force.

DETAILED DESCRIPTION

The description that follows includes exemplary apparatus, methods, techniques, and/or instruction sequences that embody techniques of the present subject matter. However, it is understood that the described embodiments may be practiced without these specific details.

The present disclosure relates to a refueling system and method for optimizing fuel flow into an aircraft by using a flow booster to adjust the fuel flow during refueling. As the fuel passes from a storage facility, through a fuel circuit and to the aircraft, the flow booster selectively adjusts flow by using an intake tuner, such as a pressurized fluid (e.g., air, fuel, hydraulic fluid, etc.) and/or a motor, to vary flow through a fuel intake (e.g., inlet coupling, pressure control valve, etc.) of the fuel circuit. The intake tuner applies a force to an inlet of the fuel intake, thereby varying a dimension (e.g., diameter, area, etc.) of the inlet and an amount of the fuel that may pass through the fuel circuit and to the aircraft. The intake tuner may apply the pressure without contact with the fuel and/or at a location a distance from the aircraft during fueling.

The flow booster may be used with a variety of fuel circuits and/or fuel equipment, such as refueling units (e.g., refuelers, hydrant systems, fuel systems, etc.), the fuel intakes (e.g., inlet couplings, pressure control valves, etc.), fuel circuits (e.g., flowlines, tanks, gauges, etc.), and/or hoses with nozzles (e.g., various types, sizes, etc.). Fluid parameters (e.g., flow rate, pressure, temperature, etc.) of the fuel flowing to the aircraft may be monitored and used to selectively adjust the intake tuner and thereby the fuel flow. Such adjustments may be used, for example, to maintain fuel flow within safety parameters (e.g., a max fluid pressure and/or other regulations) and/or to increase operating efficiency (e.g., fueling time and/or other operational limits). The flow booster may adjust fuel flow over time to continuously tune the fuel flow during the fueling operation and/or in real-time. Experiments provided herein indicate that flow boosting during refueling may increase efficiency and safety of fuel flow during the refueling.

The flow booster may be provided with the goal of achieving one or more of the following: increasing safety, maintaining the maximum fuel pressure, reducing the fueling time, optimizing fuel transfer rates, tuning fuel flow, reducing excessive bleed, reducing pressure surges, increasing fuel flow rate, increasing flow rate at elevated back pressures, managing flow at various back pressures, calibrating fuel equipment, increasing efficiency, reducing costs, operating with a variety of equipment (e.g., various nozzles), responding quickly to monitored fuel flow parameters, continuous monitoring capabilities, reducing affects (e.g., impact, stress, wear, etc.) on fuel equipment, reducing energy consumption, capturing data of fueling operations, providing upstream control, controlling based on monitored fueling parameters, removing fueling bottlenecks when needed, etc.

AIRCRAFT REFUELING

FIG. 1 depicts an example aircraft fuel site (or station) 100 used to refuel an aircraft 102. The fuel site 100 may be, for example, a surface airport, airfield, and/or terminal where one or more aircraft 102 may be stopped on the surface for deplaning, fueling (or refueling), loading, etc. In another example, the fuel site 100 may be an air location for refueling inflight.

The fuel site 100 may include a refueling system 101 including one or more fueling units 104a-d, fuel tanks 106, and a flow booster 107. As shown by this example, the fueling units may be a hydrant dispenser 104a, a refueler 104b, a fixed dispenser 104c, and/or an airborne dispenser 104d. The fueling units 104a-d may be positionable about the aircraft 102 for passing the fuel thereto.

The fueling units 104a-d each includes one or more of the fuel tanks 106 and fuel circuits 108. As shown by this example, the fuel tanks 106 may be separate from, or integral with, the refueling units 104a-d. The fuel tanks 106a-d may be containers for housing various fluids, such as fuel, additives, and/or other fluids (collectively referred to as "fuel") that may be passed to the aircraft 102 for use therein. The fueling units 104a-d and/or the fuel tanks 106 may have various configurations, such as mobile, stationary, airborne, surface, subsurface, and/or combinations thereof.

The fuel circuits 108 may be carried by the fueling units 104a-d for passing the fuel from the fuel tanks 106a,b to the aircraft 102. The fuel circuit 108 may include or be coupled to various fuel equipment, such as intakes 110 and hoses 112. The intakes 110 may be positioned about an inlet of the fuel circuit 108 to receive fuel from the various fuel tanks 106.

The hoses 112 may fluidly connect the fuel circuits 108 to the aircraft 102 for passing the fuel thereto. The hoses 112 may have nozzles 111 connectable to the aircraft 102 for selectively releasing fluid from the fuel circuit 108 into the aircraft 102. The fuel circuit 108 may have various flow control devices to pass the fuel from the intakes 110 to the hoses 112 as is described further herein.

The flow booster 107 is schematically shown about the fuel site 100. Part, or all, of the flow booster 107 may be above ground, underground, or combinations thereof. In this example, the flow booster 107 is assumed to be at an above ground location, and may be anywhere about the fuel site 100. Portions of the flow booster 107 may be at different locations and/or included with other equipment, such as the various refueling units 104a-d.

The flow booster 107 is coupled to the intake 110 and/or the fuel circuit 108 to adjust the flow of the fuel therethrough during the refueling. The flow booster 107 includes an intake tuner 115, a trigger 116, and a flow regulator 118. The intake tuner 115 is coupled to the intake coupler 110, the trigger 116 is coupled between the intake tuner 115 and the flow regulator 118. The flow regulator 118 is coupled the aircraft 102, the fuel circuit 108, the intake tuner 115, and/or the trigger 116 to monitor and/or control operation thereof. The intake tuner 115 may be coupled to the intake 110 to apply a force (e.g., fluid pressure force or drive force) thereto; the trigger 116 may be used to vary the force of the intake tuner 115; and the flow regulator may be used to activate the trigger 116 in response to measured parameters, such as fuel pressure of the fuel, as is described further herein.

While FIG. 1 shows specific examples of the fuel site 100, the refueling units 104a-d, the flow booster 107, and/or related equipment for refueling the aircraft 102, other variations are possible. For example, various combinations of one or more of the components depicted may be used.

FLOW BOOSTER

Figure 2A:
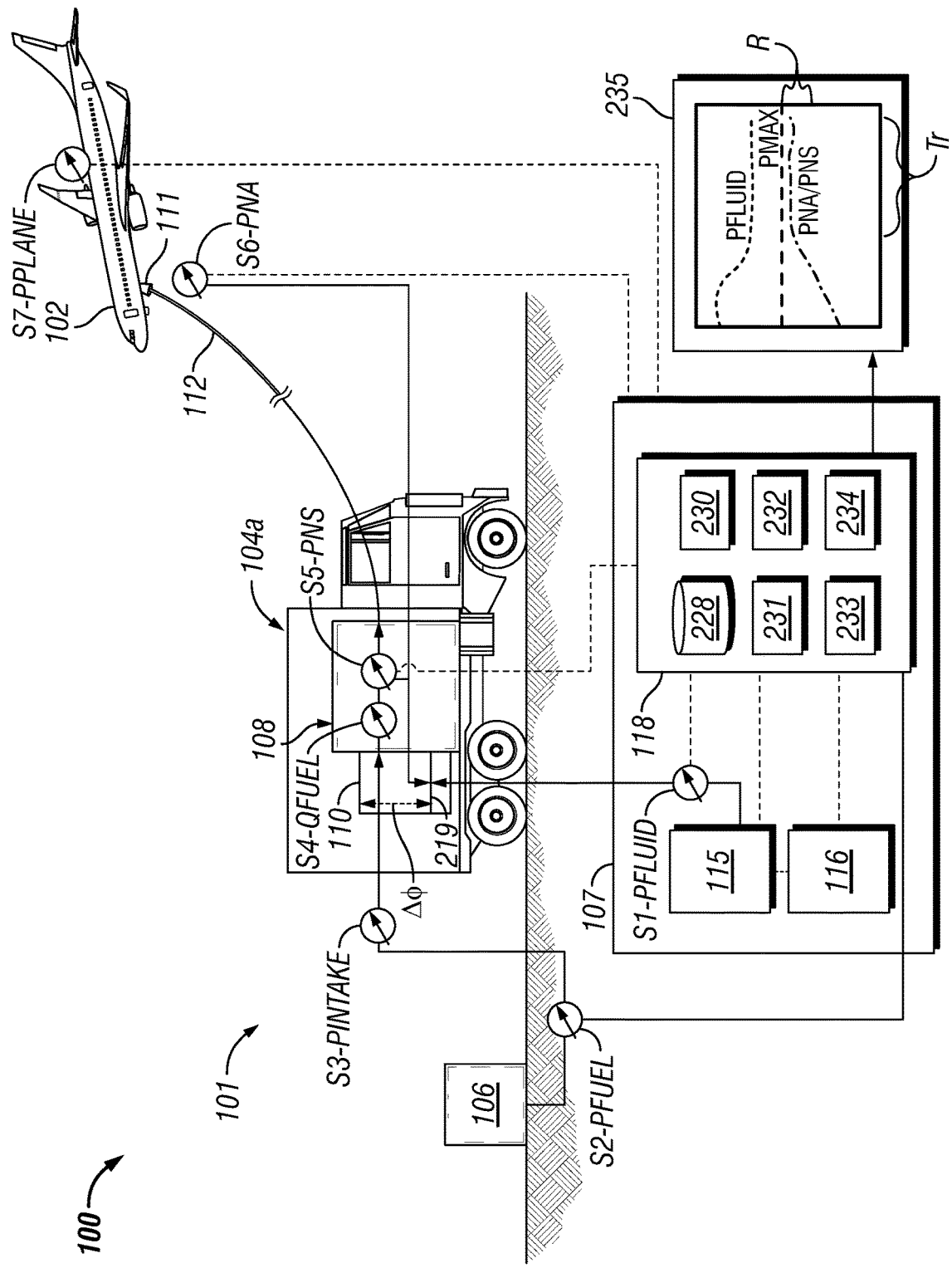
FIG. 2A is a schematic diagram depicting features of the flow booster and the fuel circuit of the refueling system for a hydrant dispenser type of refueling unit.

FIG. 2A is a schematic diagram showing the hydrant dispenser 104a and the flow booster 107 in greater detail. This view shows operation of the refueling system 101 with the flow booster 107. As shown in these views, the hydrant dispenser 104a is a mobile vehicle (e.g., truck) coupled to the surface fuel tank 106 by a subsurface flowline, and to the aircraft 102 by the hose 112. The hydrant dispenser 104a includes the fuel circuit 108 with the intake 110.

As shown in this view, the fuel intake 110 has a housing with a fuel inlet therethrough. The fuel inlet is fluidly connected to the fuel tank 106 to receive the fuel therethrough. The housing has a movable wall 219 (e.g., a piston, door, etc.) defining a variable geometry (e.g., inlet diameter, area, etc.) $\Delta\phi$ of the fluid inlet. The movable wall 219 may be moved by the flow booster 107 to vary the geometry of the fuel inlet, thereby altering flow of the fuel through the fuel circuit 108 and into the aircraft 102.

The pressure of the fuel at the fuel circuit (e.g., the simulated nozzle pressure (PNS)) and/or the pressure of the fuel at the nozzle (e.g., the actual nozzle pressure (PNA)) may be applied to the movable wall 219. This fuel pressure applies a fuel force to the fuel side of the movable wall 219. The flow booster 107 maybe used to provide an opposing tuning force against the fuel force.

The intake tuner 115, the trigger 116, and the flow regulator 118 of the flow booster 107 may be used to vary the tuning force applied to the movable wall. The intake tuner 115 may have various configurations, such as a fluid source with a pressurized fluid. The pressurized fluid has a fluid pressure that acts as the tuning force against the movable wall 219.

The trigger 116 may be a valve used to vary the fluid pressure released from the fluid pressure source 115 to the movable wall 219, thereby varying the tuning force. For example, the trigger 116 may be a solenoid electrically operated by the flow regulator 118 to adjust pressure of the pressurized fluid (Pfluid) applied to the movable wall 219. The trigger 116 may be selectively activated to move between positions and/or to adjust to various levels by the flow regulator 118. The flow regulator 118 may be electrically coupled to the trigger 116 for selective activation thereof.

When the booster 107 changes the tuning force relative to the pressure force (e.g., from PNS and/or PNA) in the fuel circuit 108, the variable opening $\Delta\phi$ changes (e.g., increases/decreases diameter), thereby altering the flow of the fuel (Qfuel) into the aircraft 102. For example, when the tuning force exceeds the fuel force, the movable wall may be urged to a closed (or more closed) position with a reduced inlet diameter $\Delta\phi$, thereby reducing the flow of the fuel into the flow circuit. In another example, when the tuning force is less than or equal to the fuel force, the movable wall may be released to an open (or more open) position with an increased inlet diameter $\Delta\phi$, thereby increasing the flow of the fuel into the flow circuit.

The flow regulator 118 may be coupled to the aircraft 102, the fuel circuit 108, and/or the intake tuner 115 to monitor and/or control operation thereof. The trigger 116 may be controlled by the flow regulator 118 to selectively release the pressurized fluid from the fluid source 115 to the movable wall 219. Using the trigger 116, the flow regulator 118 may selectively adjust the intake 110 to selectively vary the flow of the fuel into the fuel circuit 108 and/or the aircraft 102.

The flow regulator 118 may include a database (memory) 228, a processor (e.g., Central Processing Unit (CPU)) 230, a controller 231, a power supply 232, a communicator 233, and an input/output device 234. The database 228 may receive and store data from various sources, such as the sensors S1-S7 and/or other sources on or off the fuel site 100. For example, the regulator 118 may be coupled to the sensors about the refueling system 101, such as sensors S1 to measure the fluid pressure (Pfluid), S2 to measure fuel pressure (Pfuel), S3 to measure intake pressure (Pintake), S4 to measure a flow rate of the fuel passing through the fuel circuit 108 (Qfuel), S5 to measure simulated nozzle pressure (PNS), S6 to measure actual nozzle pressure (PNA), and S7 to measure pressure at the aircraft (backpressure—Pplane). The PNS sensor S5 may be, for example, a venturi sensor and the flow rate sensor S4 may be a flowmeter. Other parameters may be measured by the sensors, such as flow rate, temperature, composition, etc.

The processor 230 may process (e.g., combine, interpret, analyze, calculate, etc.) the received data. The controller 231 may be activated by the processor to take action on the trigger 116, the intake tuner 115, and/or other portions of the refueling system 101. The power supply 232 may power the flow booster 107.

The communicator 233 may pass power and/or data signals by wired or wireless connection between the regulator 118 and various components of the refueling system 101 as indicated by the dotted lines. The input/output device 234 may be used to input data and/or generate outputs. The input/output device 234 may be used to allow a user input to supplement, alter, generate, and/or otherwise take action based on the data received as is described further herein. Various outputs may be generated, such as reports, alarms, displays, etc. An example output 235 depicting pressure measurements taken by sensors 51, S5, and S6 over time is shown.

As shown in output 235, the flow booster 107, flow regulator 118, the trigger 116, and/or the intake tuner 115 may be operated with the goal of tuning the pressure measurements of the refueling system 101 to maintain fuel pressures entering the aircraft 102 (e.g., at nozzle 111 and/or sensor S6 (PNA)) to within a desired range. The flow regulator 118 may be set to activate the trigger 116 when the sensed pressures reach a minimum trigger level for activation of the trigger. The minimum trigger level may be, for example, a pressure corresponding to a fuel pressure within a range R (e.g., of about 75%) of a maximum pressure (Pmax) as defined by operating specifications and/or government regulations. When the measured pressure falls below the minimum trigger level, the flow regulator 118 may activate the trigger 116 to shift the intake tuner 115, thereby varying the fuel pressure.

This fuel pressure may be maintained below the Pmax and/or within the predetermined range R. This range R may be, for example, a range that provides maximum efficiency within operating capabilities. Such range may be, for example (and without limitation), between about 80 to about 100% (or 60-100%, or 75-100%) of the Pmax. This range R may be established for a predetermined duration of, for example about 50% (or 60% or 70% or 80%) or more of the refueling time Tr.

FIGS. 2B1 and 2B2 show examples of the fuel intake 210a,b having a fuel inlet with a variable inlet geometry (Δφ). FIG. 2B1 shows the fuel intake 210a in a pressure control configuration. FIG. 2B2 shows the fuel intake 210b in a motor configuration. Each of the fuel intakes 210a,b have a housing 225a,b with a fuel inlet 229a,b and a fuel outlet 237a,b, and a piston 219a,b slidably movable therein. A fuel passage extends between the fuel inlet 229a,b and the fuel outlet 237a,b through portions of a wall and/or annular passage of the housing 225a,b.

In the version of FIG. 2B1, the housing 225a is shown as a cylindrical member with a piston chamber divided into a fluid chamber and a fuel chamber by a piston head of the piston 219a. The intake tuner of this configuration is a fluid source 115a activated by a valve trigger 116a. The fluid source 115a may be a container housing (e.g., tank) filled with a pressurized fluid, such as fuel, air, hydraulic fluid, etc., capable of applying a fluid pressure force Fp to the movable wall (piston head) 219 against the fuel force Ff. The fluid source 115a may be in selective fluid communication with the fuel intake 110 via the valve trigger 116a.

The pressurized fluid from the fluid source 115a is in fluid communication with the fluid chamber, and the fuel is in fluid communication with the fuel chamber. The piston head is slidably movable in the housing 225a by the fuel force Ff applied by the fuel entering the fuel chamber, and by the fluid pressure force Fp of the pressurized fluid entering the fluid chamber from the pressure source 115a.

Upon activation of the valve trigger 116a by the flow regulator, the valve trigger 116a may vary an amount of the pressurized fluid from the pressure source 115a, thereby varying the tuning force applied to a fluid side of the piston 219a. As the pressure varies, the piston 219a shifts within the housing 225a.

The piston 219a also has a piston tail coupled to the piston head by a spring-loaded piston rod, and is movable with the piston head. The piston tail is slidably positionable about the fuel inlet 229a to selectively vary flow therethrough. The piston tail is movable between a fully open position with the fuel inlet open to receive the fuel therethrough, and a fully closed position with the piston blocking the fuel inlet 229a. The piston tail may be in various positions between the fully open and closed positions to vary the flow of fuel into the fuel inlet 229a.

The fuel intake 210b of FIG. 2B2 is similar to that of FIG. 2B1, except that the housing 225b has a different configuration and the intake tuner is a motor 115b activated by an electrical trigger 116b (e.g., a solenoid, switch, circuit, etc.). In this configuration, the motor 115b is coupled to the piston head by the piston rod. The motor 115b may have gears, linkages, or other devices to drive the piston 219a. The motor 115b may be, for example, a conventional servo motor electrically activatable by the electrical trigger 116b.

The flow regulator 118 may activate the electrical trigger 116b to trigger the motor 115b to apply a drive force Fd to the piston 219a opposite the fuel force Ff, thereby moving the piston 219a. The piston 219a may be movable by the motor 115b about the inlet 229b to selectively permit more or less fuel to pass therethrough. The piston head is slidably positionable about the fuel inlet 229b between a fully open position with the fuel inlet open to receive the fuel therethrough, and a fully closed position with the piston blocking the fuel inlet 229a to selectively vary the flow through the fuel inlet.

Figure 3A:
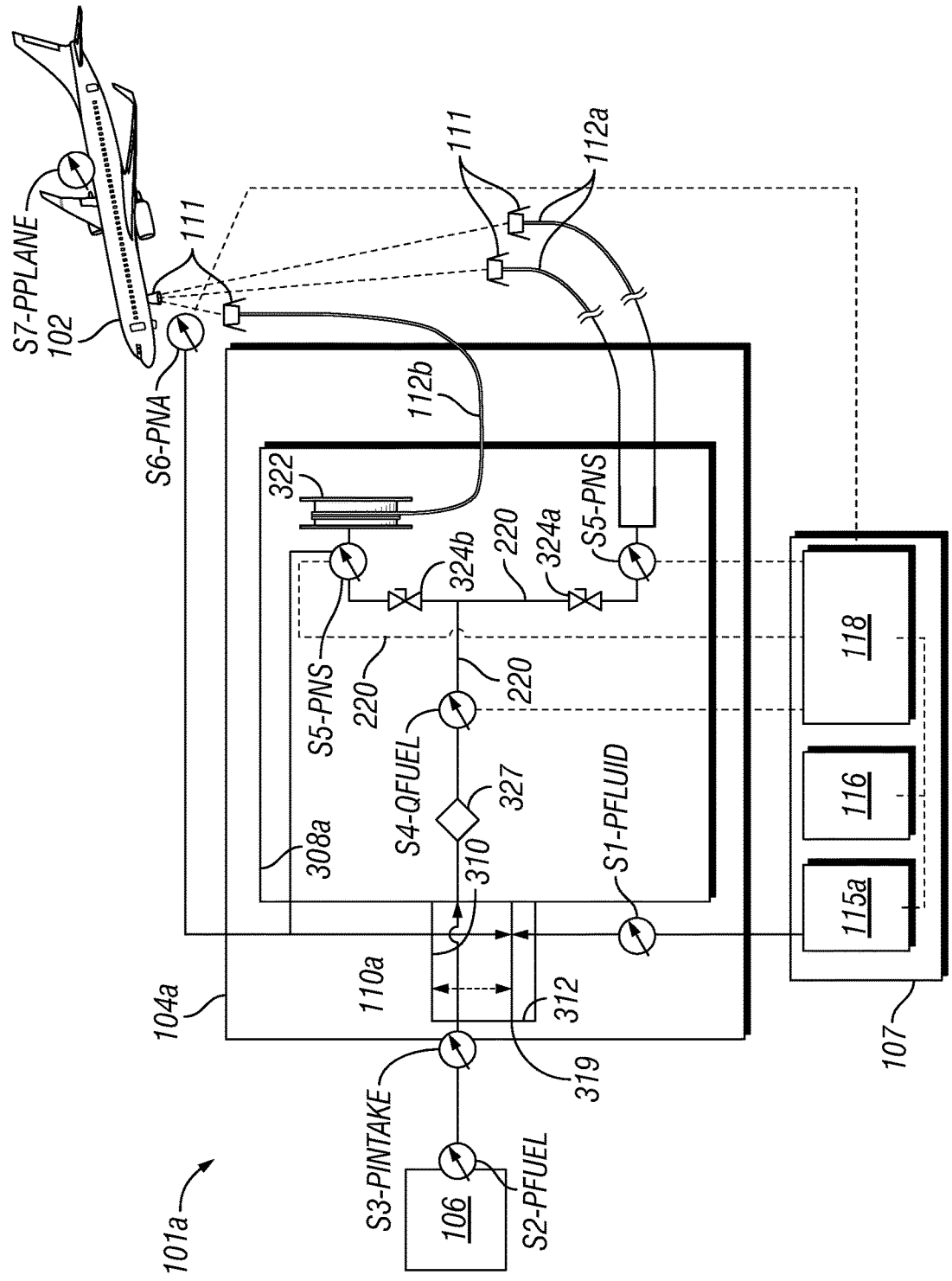
FIGS. 3A and 3B are schematic diagrams of the refueling system with the flow booster in a hydrant dispenser and a refueler configuration, respectively.
Figure 3B:
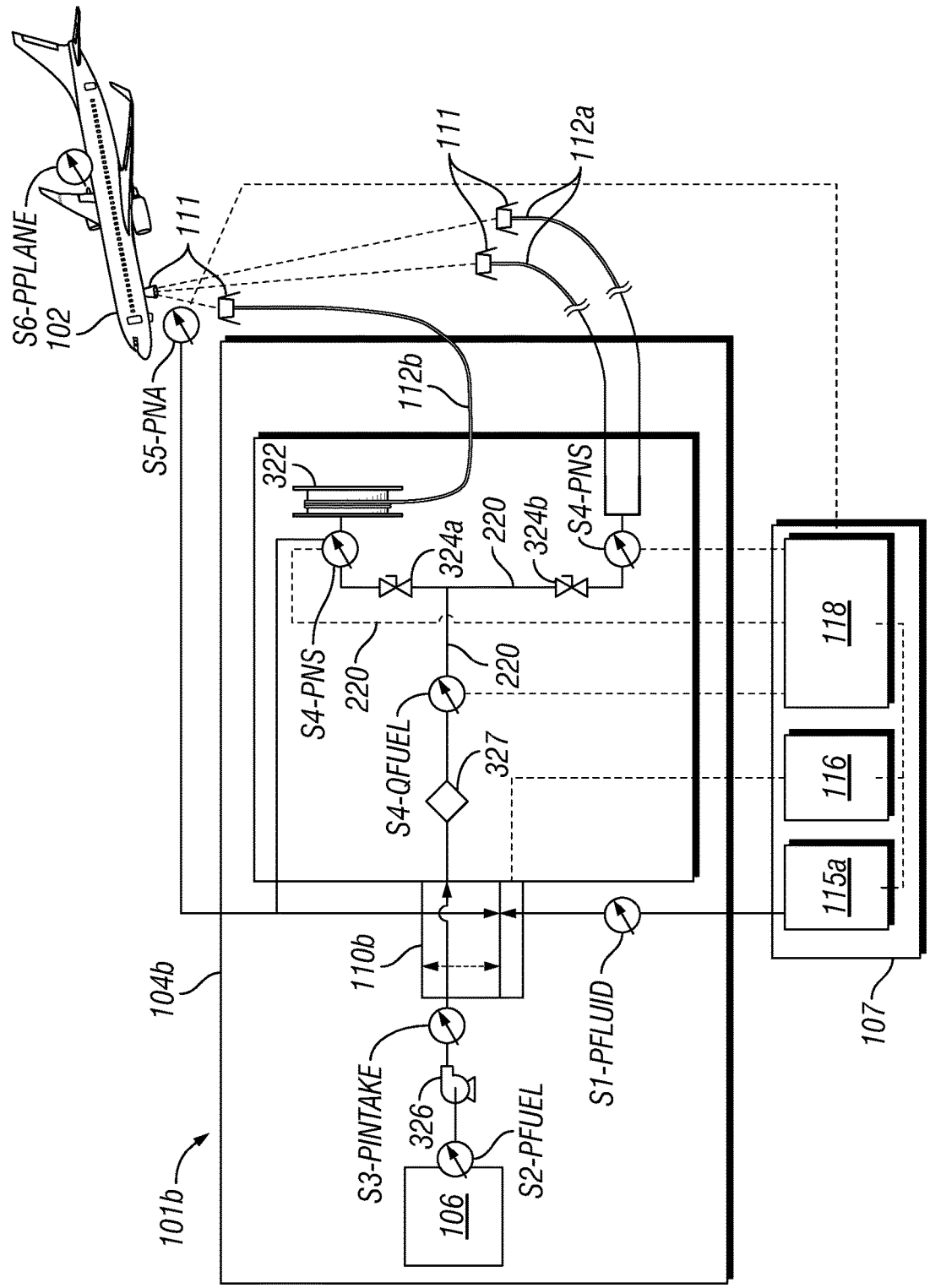

FIGS. 3A and 3B are schematic diagrams depicting details of the refueling system 101a,b, respectively. FIG. 3A shows details of the refueling system 101a with the hydrant dispenser 104a and flow booster 107. FIG. 3B shows the refueling system 101b with the refueler 104b and flow booster 107.

As shown in the example of FIG. 3A, the hydrant dispenser 104a includes the fuel tank 106 and the fuel circuit 308a. The fuel circuit 308a has the inlet coupling 110a to receive fuel from the fuel tank 106 and the tuning force from the intake tuner 115. The intake coupler 110a may be a device with a variable fuel inlet 310 and a fluid inlet 312 with the movable wall 319 therebetween. Examples of intake couplers that may be used include a hydrant coupler with pressure control commercially available from EATON™ at www.eaton.com.

The fuel circuit 308a includes flowlines 220 extending from the inlet coupling 110a to hoses 112a,b. The flowlines 220 may be tubular members (e.g., pipes, conduits, tubes, etc.) extending between the fuel inlet 310a and the hoses 112a,b for passing the fuel from the fuel tank 106 to the aircraft 102. Various combinations of the tubular members may be connected to define a fuel path for flow of the fuel through the fuel circuit. Portions of the tubular members may be removably connectable to selectively configure the fuel circuit as needed. Connections between the fuel circuit 108 and other portions of the refueling system 101 may be part of, or coupled to, the fuel circuit 308a.

One or more hoses 112a,b may be coupled to the fuel circuit 308a for connection to the aircraft. In this example, two sets of hoses 112a,b with nozzles 111 are depicted. The hoses 112a include the deck hoses 112a, and hoses 112b are on a hose reel 322. The hose reels 322 may be provided to support the hoses 112a,b. The hoses 112a,b have the nozzles 111 at an end thereof connectable to the aircraft 102 for passing the fuel thereto. The nozzles 111 may have triggers to selectively release the fuel from the hoses 112a,b into the aircraft 102.

The fuel circuit 308a is provided with various fluid control devices for operation with the fuel passing through the fuel circuit 308a. The fuel circuit 308a includes valve 324a for passing the fuel to the deck hoses 112a, and valve 324b for passing the fuel to hose 112b. The fuel circuit 308a also has a fuel filter 327 for filtering the fuel as it passes through the fuel circuit 308a. Other flow control devices, such as valves, filters, restrictors, nozzles, dump tanks, sampling lines, dump lines, etc., may be positioned at various locations along the fuel circuit for performing various fluid functions. The valves 324a,b may include various devices for selectively passing the fuel to portions of the fuel circuit 308a, such as the inlet coupling 110a, the flow control valves 324a,b and other valves. The nozzle 111 of the hoses 112a may also act as a valve and/or flow control device to selectively release the fuel into the aircraft 102.

As also shown in FIG. 3A, the trigger 116 of the flow booster 107 is coupled to the intake coupler 110a to apply the tuning force from the intake tuner 115. The regulator 118 of the flow booster 107 is coupled to the sensors S1-S7 to detect fluid parameters, such as nozzle pressure (PNS/PNA), fuel flow rate (Qfuel), and fluid pressure (Pfluid). These fluid parameters may be monitored by the flow regulator 118 to activate the trigger 116 to vary the tuning force applied by the intake tuner 115 to the fluid inlet 312.

The pressure (Pfluid) applies a force against the movable wall 319a. A counter force is applied to the movable wall 319a from the nozzle pressure (PNA or PNS). The pressure (Pfluid) may be adjusted by the flow regulator 118 to overcome the nozzle pressure (PNA or PNS) sufficient to shift the movable wall 319a to alter the dimension of the fuel inlet 310, thereby altering the flow rate (Qfuel). The regulator 118 may continuously monitor the sensors S1-S7 and make adjustments to the fuel inlet 310 and/or the intake coupler 110a to alter fuel flow as needed. These adjustments may be made, for example, by activating the regulator 118 to signal the valve (e.g., solenoid valve) 116 to adjust the pressurized fluid flowing from the fluid source 115 to the intake coupler 110a, thereby altering the force applied to the movable wall 319, the flow of fuel through the fuel intake 110a, and the fuel pressure at the aircraft 102. These adjustments may be made to maintain the nozzle pressure (PNS) at or below a pre-defined maximum pressure (Pmax), and/or to boost the flow of the fuel to within a range of the maximum pressure.

The refueling system 101b of FIG. 3B is similar to the refueling system 101a of FIG. 3A, except that a refueler 104b with the fuel tank 106 included therein is shown. Also, a pump 326 is provided to pump the fuel from the fuel tank 106 to the fuel inlet 310b, and the fuel intake 110b is an inline pressure control valve adjustable by the intake tuner 115 and the trigger 116. Examples of pressure control valves that may be used include an air operated inline pressure control valves commercially available from CARTER™ at www.eaton.com.

EXAMPLES

FIGS. 4-10B depict graphs 400-1000b plotting various parameters of the refueling system 101 measured during testing. The tests compare refueling operations performed using the refueling system 101 with flow boost provided by applying the pressurized fluid (Pfluid) to the fuel circuit (e.g., at the intake) to those without the flow boost. The flow boost is intended to manipulate fuel flow rates (Qfuel) into the aircraft, thereby reducing refueling times. The flow boost is also intended to provide tuning capabilities to selectively adjust the fuel flow (and thereby the pressures) to maintain nozzle pressures (PNS/PNA) within predefined limits, such as the maximum pressure (Pmax).

The testing is performed on a test rig with a refueling system in the configuration similar to the refueling system 101 in FIG. 3A. A jet fuel was used under a supply pressure to the fuel circuit at ambient temperature via an intake coupler. For test purposes, the test rig is provided in place of the aircraft 102, and a test valve is used at the test rig to shut off flow to the test rig during closure tests.

During the testing, fuel passes from the fuel tank 106, through the fuel circuit 108, and into the rig, and measurements are taken from one or more of the sensors S1-S7, such as the venturi sensor (PNS), backpressure sensor (Pplane), rig pressure sensor (Pintake), nozzle pressure (PNA), air reference pressure (Pfluid), and the fuel flow rate sensors (Qfuel) in the refueling system. The measurements include, for example, pressure and/or flow rate measurements of the fuel passing through the refueling system. For the tests of Examples 1-4, the flow booster 107 is deactivated so that no flow boost is provided. For the tests of Examples 5-7 with the flow boost, the flow booster 107 is activated to provide the flow boost.

Example 1-Calibration of Venturi Sensor

In this example 1, a calibration of the sensors in the refueling system is performed. During the calibration, the fuel is passed from the fuel tank into the fuel circuit. The sensors collect measurements as a flow rate (Qfuel) of the fuel passing into the fuel tank is varied. The tests begin with the flow rate (Qfuel) increasing from about 0 GPM to about 280 GPM and falling back to about 120 GPM during an initial period 460a of from about 175 to about 275 seconds.

During a critical period 460b from about 275 to about 400 seconds, the PNS/PNA stabilizes to a critical pressure of from about 20 psi (1.41 Kg/cm2) to about 30 psi (2.11 Kg/cm2). During a final period 460c of from about 400 seconds to about 500 seconds, the flow rate (Qfuel) increases back up to about 280 GPM. During the periods 460a-c, measurements are taken from the sensors PNS, Pintake, Pplane, PNA, Pfluid, and Qfuel.

Figure 4:
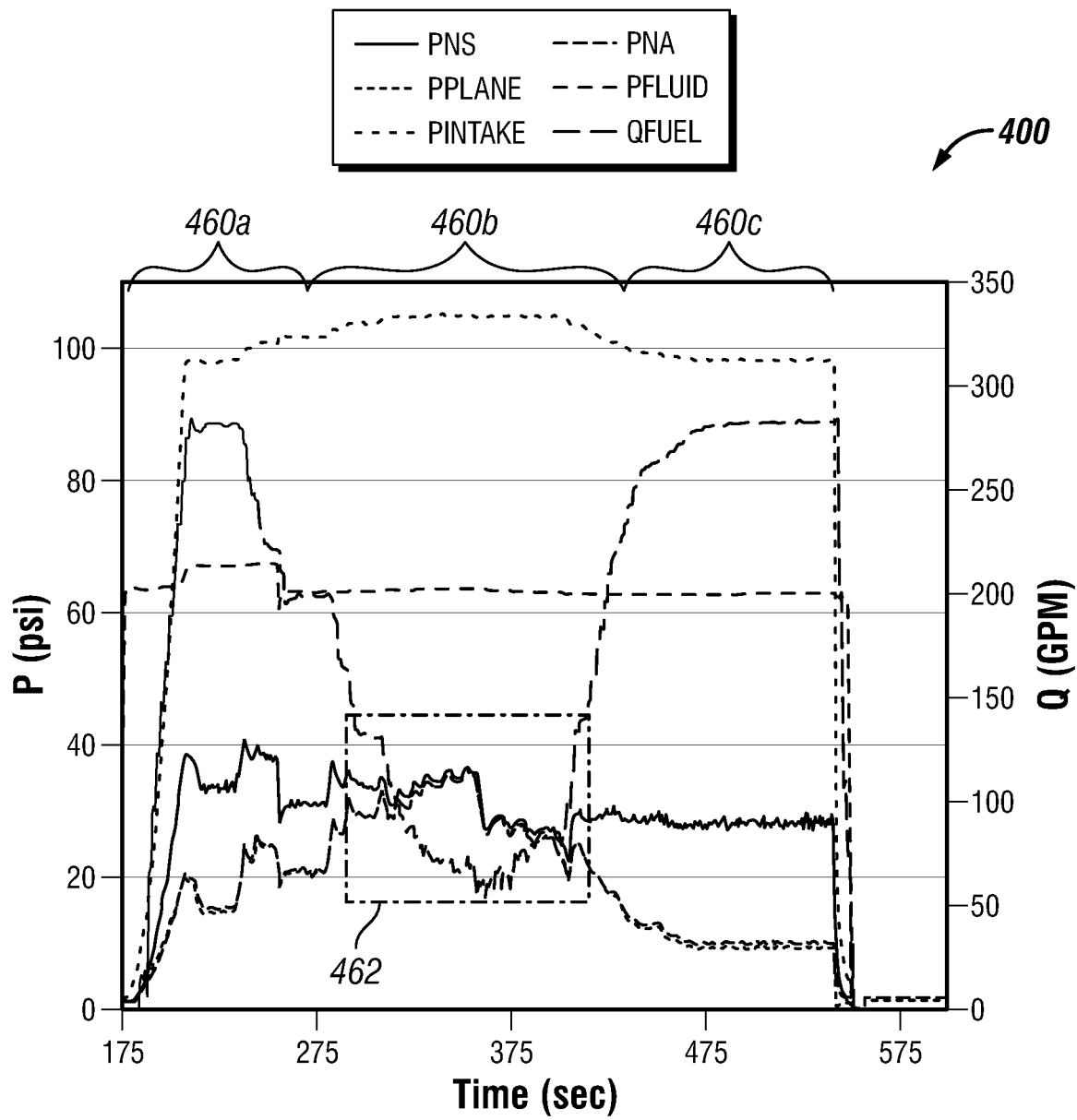
FIG. 4 is a graph depicting calibration of a venturi gauge for measuring simulated nozzle pressure (PNS).

FIG. 4 is a line graph 400 depicting the measurements taken by the fluid sensors in the fuel circuit during the calibration. The graph 400 plots pressure (P) (Y1) and flow rate (Q) (Y2) versus time for the fluid sensors PNS, Pintake, Pplane, PNA, Pfluid, and Qfuel. As shown by graph 400, the actual nozzle pressure (PNA) and the simulated nozzle pressure (PNS) measure differently during the initial and final periods 460a,c. As also shown by graph 400, the actual nozzle pressure (PNA) and the simulated nozzle pressure (PNS) measure about a same pressure during a stable period of time as indicated by box 462 and within the critical period 460b. This may be used to confirm that the actual nozzle pressure (PNA) and the simulated nozzle pressure (PNS) sensors are calibrated.

Example 2-Closure Test without Boost-at Varied Fluid Pressure (Pfluid)

In this example, a closure test is performed on the refueling system at different fluid pressures (Pfluid) and with the flow booster 107 deactivated. The closure test involves passing the fuel from the fuel tank through the fuel circuit and to the test rig. During the closure test, the test valve is closed, and measurements are collected from each of the sensors PNS, Pintake, Pplane, PNA, Pfluid, and Qfuel.

Figure 5A:
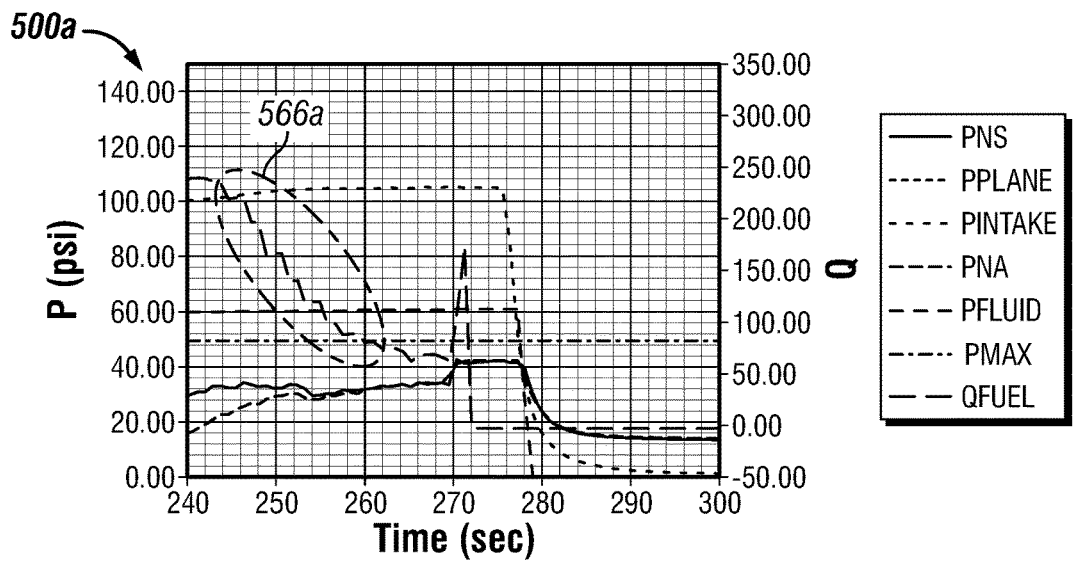
FIGS. 5A-5C are graphs depicting a closure test at different fluid pressures.
Figure 5B:
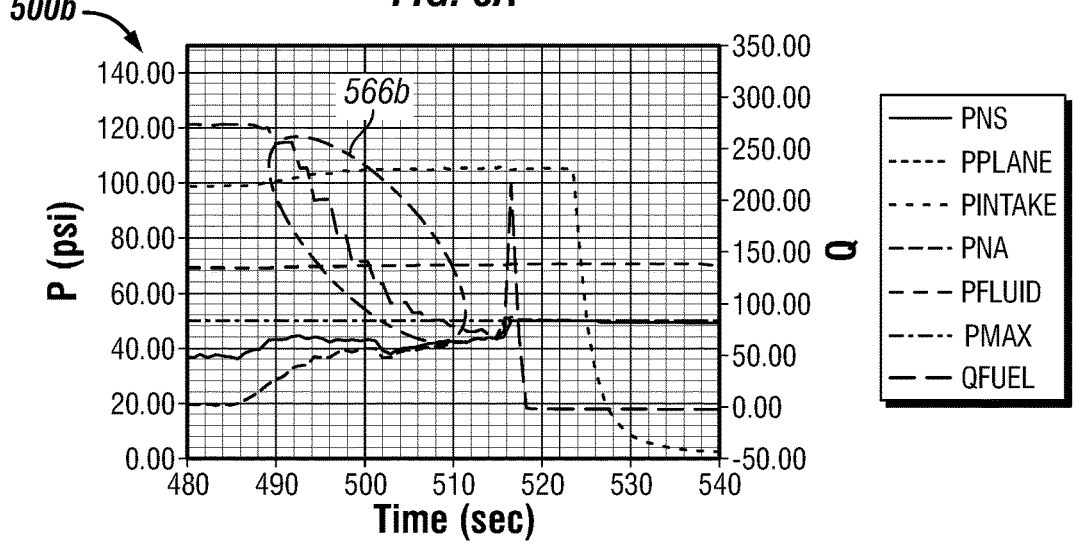
Figure 5C:
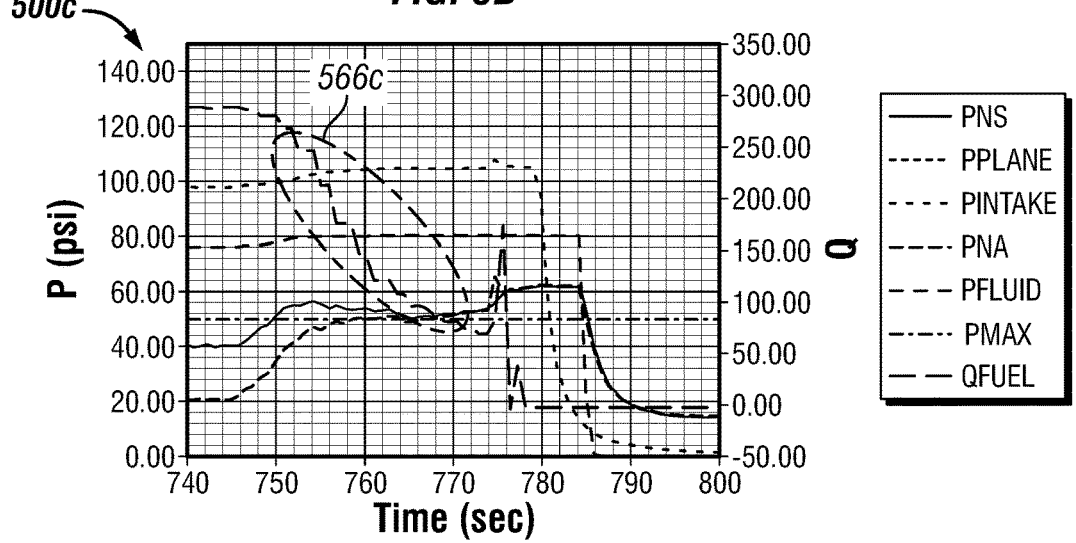

FIGS. 5A-5C are graphs 500a-c depicting measurements taken during the closure test. The graphs 500a-c plot pressure (P) (Y1) and flow rate (Q) (Y2) versus time for the measurements collected from each of the PNS, Pintake, Pplane, PNA, Pfluid, and Qfuel sensors. The closure test is performed at a fluid pressure (Pfluid) of about 60 psi (4.22 Kg/cm2) (FIG. 5A), at a fluid pressure (Pfluid) about 70 psi (4.92 Kg/cm2) (FIG. 5B), and at a fluid pressure (Pfluid) of about 80 psi (5.63 Kg/cm2) (FIG. 5C), and with the maximum pressure (Pmax) set at 55 psi (3.87 Kg/cm2).

As shown by the graphs 500a-c, once the test valve is closed, the flow rate (Qfuel) of the fuel decreases as indicated by the circles 566a-c. From the graphs 500a-c, a maximum pressure of the pressurized fluid (Pfluid-max) may be determined, namely 60 psi (4.22 Kg/cm2) (FIG. 5A), 70psi (4.92 Kg/cm2) (FIG. 5B), and 80 psi (5.63 Kg/cm2) (FIG. 5C). These graphs indicate that the pressure of the pressurized fluid (Pfluid-max) needed to maintain the nozzle pressures (PNS/PNA) below the maximum pressure (Pmax) is about 70 psi (4.92 Kg/cm2).

Example 3—Closure Test without Boost—Using Different Nozzles

In this example, a closure test is performed on the refueling system using different nozzles and with the flow booster deactivated. The closure test involves passing the fuel from the fuel tank through the fuel circuit and to the test rig. Three different nozzles are connected to the test rig, and the closure test is repeated using each of the three nozzles. The fuel pressure (Pintake) and the fluid pressure (Pfluid) remain constant at 100 psi (7.03 Kg/cm2) and 61psi (4.29 Kg/cm2), respectively, during each of these closure tests. During the closure test, the test valve is closed, and measurements are collected from each of the sensors PNS, Pintake, Pplane, PNA, Pfluid, and Qfuel to determine if differences in measurements result from using different nozzles.

Figure 6A:
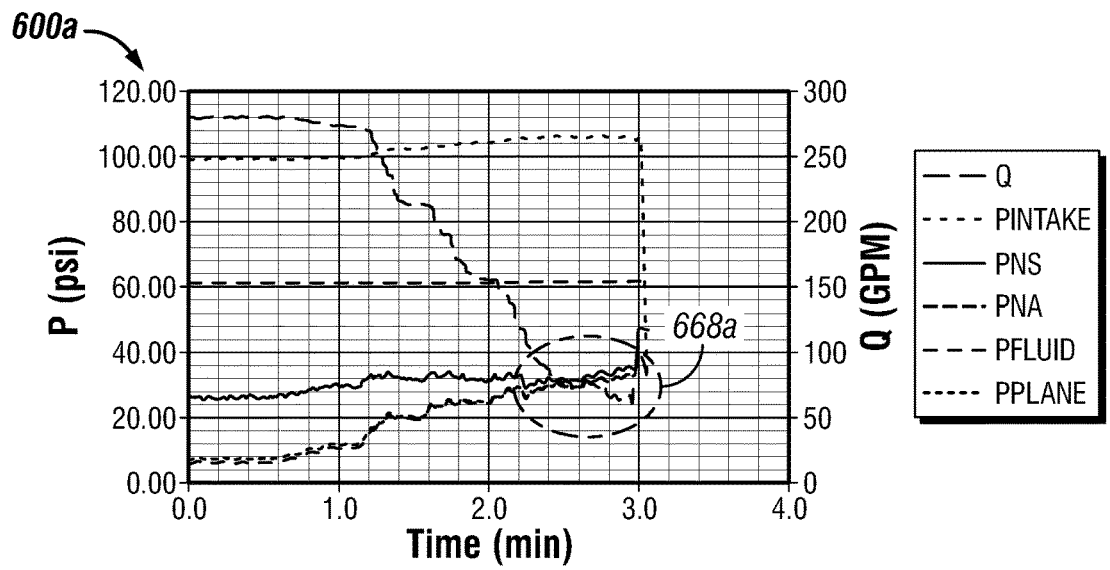
FIGS. 6A-6C are graphs depicting a closure test using different nozzles.
Figure 6B:
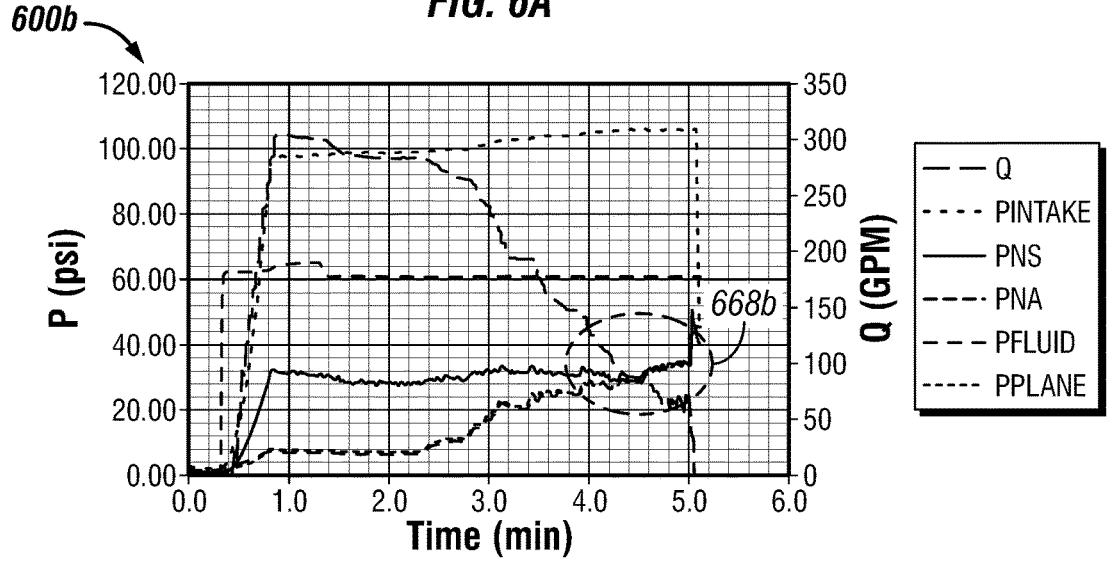
Figure 6C:
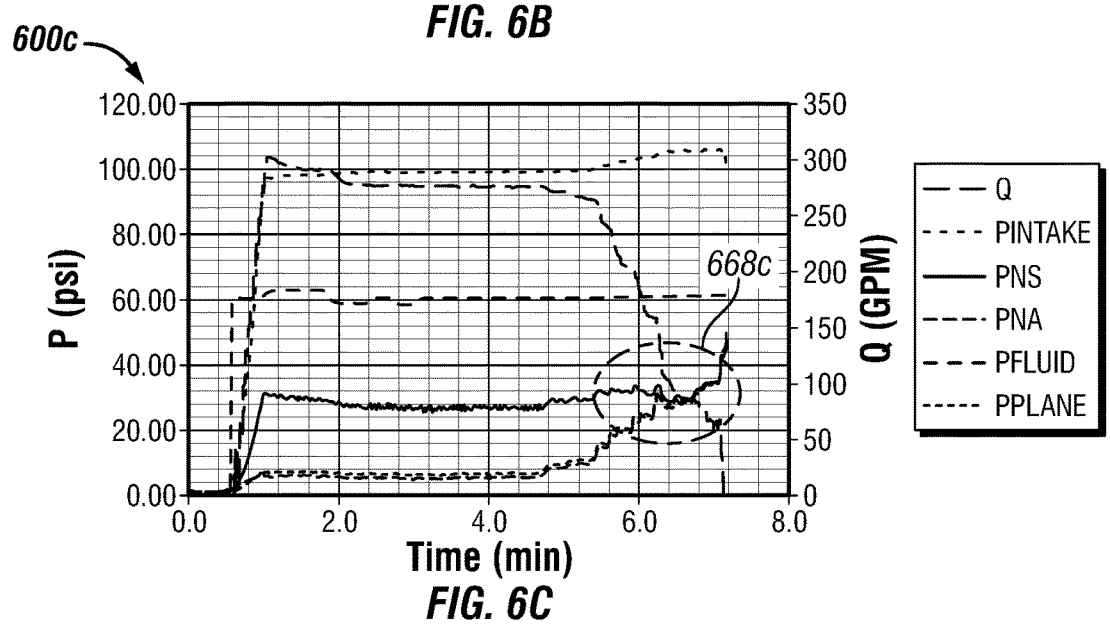

FIGS. 6A-6C show graphs 600a-c depicting measurements taken during the closure test. The graphs 600a-c plot pressure (P) (Y1) and flow rate (Q) (Y2) versus time for the measurements collected from each of the PNS, Pintake, Pplane, PNA, Pfluid, and Qfuel sensors. The closure test is performed using a 45 psi (3.16 Kg/cm2) nozzle (FIG. 6A), 50 psi (3.52 Kg/cm2) nozzle (FIG. 6B), and 55 psi (3.87 Kg/cm2) nozzle (FIG. 6C).

As shown by the graphs 600a-c, once the test valve is closed, the flow rate (Qfuel) of the fuel decreases. As also shown by the graphs 600a-c, the nozzle pressures (PNS, PNA) remain consistent with each of the nozzles tested within the critical period as shown by circles 668a-c. These graphs 600a-c indicate that there is little difference in measurements between the nozzles.

Example 4—Comparison of PNS and PNA for the Closure Tests of Example 3

Figure 7A:
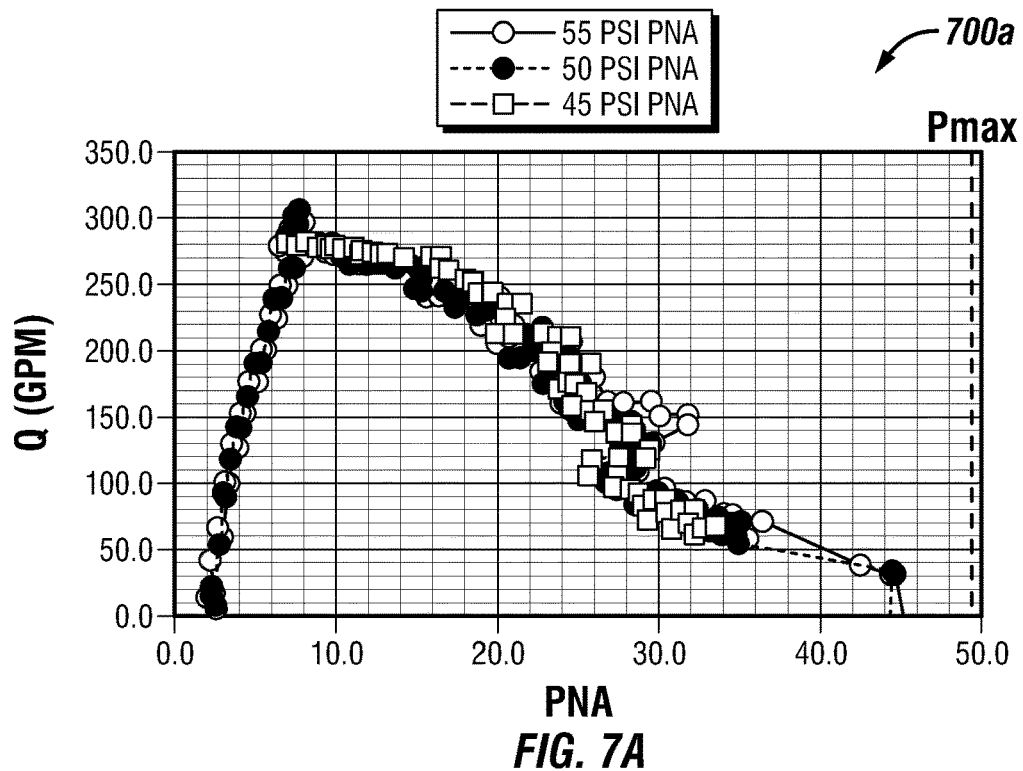
FIGS. 7A-7C are graphs depicting flow rate versus actual nozzle pressure (PNA), PNS, and both PNA/PNS, respectively, for closure tests without flow boost and with different nozzles.
Figure 7B:
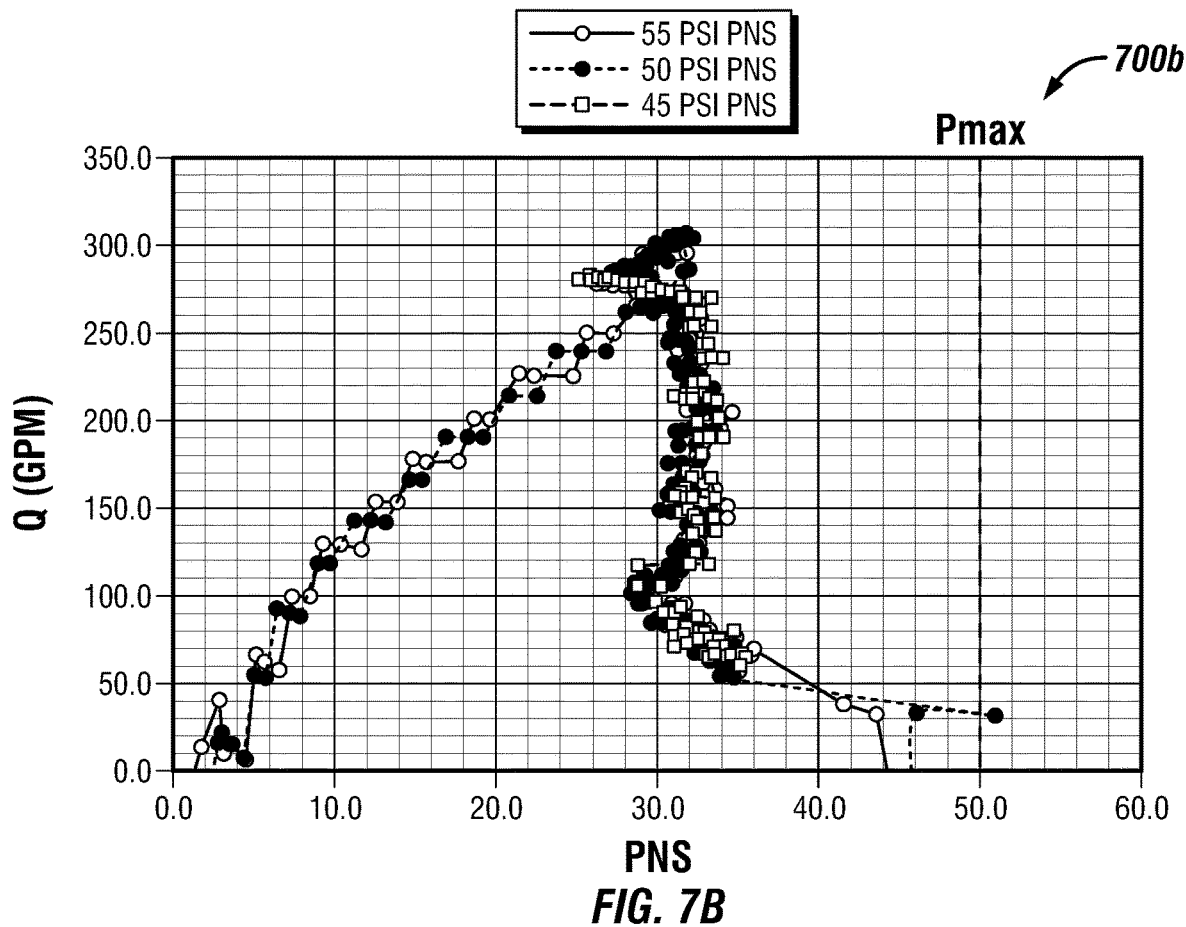
Figure 7C:
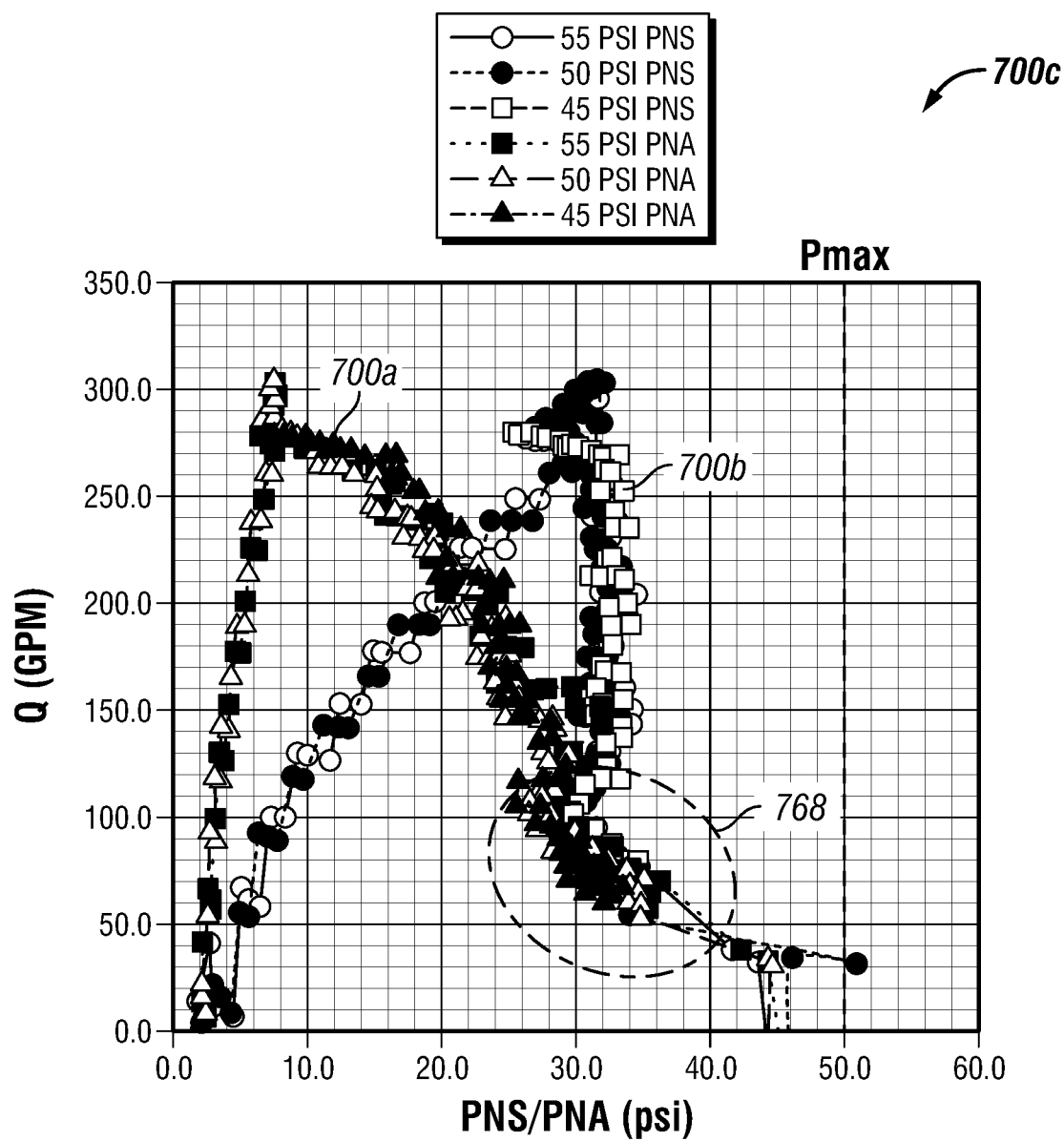

The graphs of FIGS. 6A-6C are analyzed and used to generate the graphs 700a-c of FIGS. 7A-7C. The graphs 700a-c plot flow rate (Q) (Y axis) versus pressure (PNS), (PNA), (PNS/PNA), respectively, (X axis) for each different nozzle pressures. FIG. 7A plots flow rate (Qfuel) of the actual nozzle pressure (PNA) for the 45 psi (3.16 Kg/cm2) nozzle (FIG. 6A), 50 psi (3.52 Kg/cm2) nozzle (FIG. 6B), and 55 psi (3.87 Kg/cm2) nozzle (FIG. 6C), respectively. FIG. 7B plots flow rate (Q) of the fuel using nozzle (PNS) pressure for the 45 psi, 50 psi, and 55 psi (3.87 Kg/cm2) nozzles of FIGS. 6A-6C, respectively. FIG. 7C plots the graphs of FIGS. 7A and 7B on the same graph 700c. A max pressure (Pmax) line at 50 psi (3.52 Kg/cm2) is also shown in the graphs 700a-c.

As shown by graphs 700a-700c, the fuel flow rate during the closure test (without flow booster) remains well below the maximum pressure (Pmax) for most of the closure test. As also shown by graph 700c, the flow rate for each of the pressure sensors (PNS/PNA) is in agreement for a portion of the closure test as the pressure of both of the pressure sensors (PNS/PNA) approaches the maximum pressure (Pmax) as indicated by the circle 768.

Example 5—Closure Test with Fuel Boost—PNA Comparison

In this example, a closure test is performed on the refueling system with the flow booster 107 activated, and with a comparison to the closure test of Figure7A without flow boost. The closure test involves passing the fuel from the fuel tank through the fuel circuit and to the test rig, and closing the test valve as in the closure tests of FIGS. 5A-6C. In this version, the flow boost is provided by adjusting the fluid pressure (Pfluid) for about 30 seconds. These adjustments in pressure are used to vary (e.g., boost) the flow rate of fuel (Qfuel) into the fuel circuit as shown in FIG. 2A. During this closure test, the maximum pressure (Pmax) is 50 psi (3.52 Kg/cm2), and measurements are collected from each of the sensors PNS, Pintake, Pplane, PNA, Pfluid, and Qfuel.

Figure 8A:
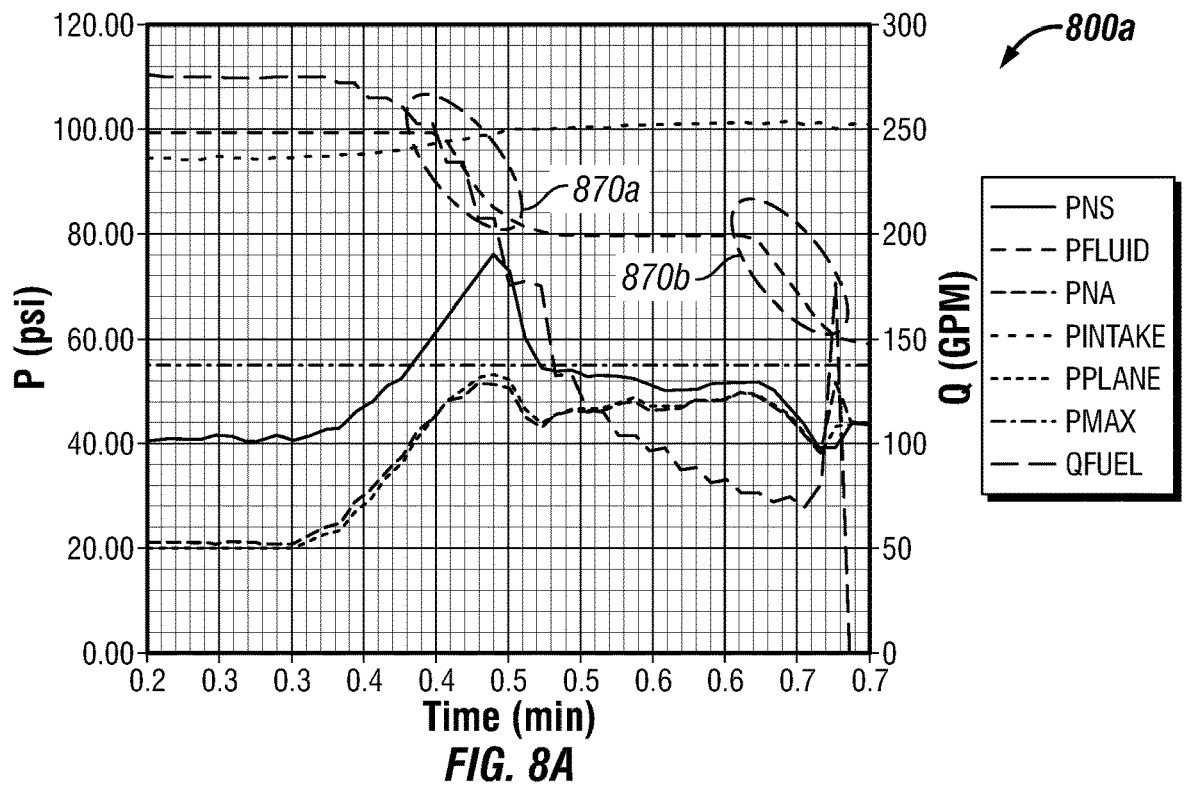
FIG. 8A is a graph depicting a closure test with two flow boosts by the flow booster.
Figure 8B:
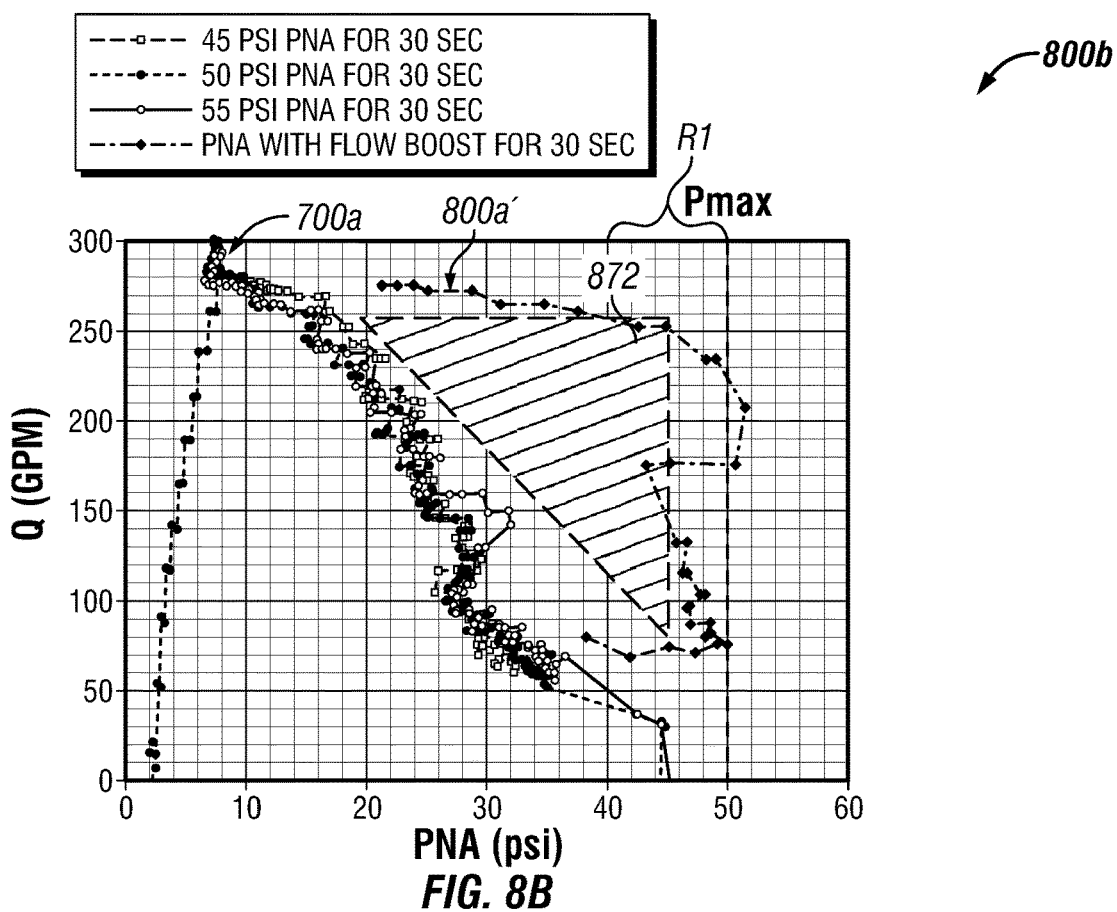
FIG. 8B is a graph comparing the closure tests of FIGS. 7A and 8A.

FIGS. 8A-8B are graphs 800a-b depicting measurements taken during the closure test with the flow booster activated. The graph 800a plots pressure (P) (Y1) and flow rate (Q) (Y2) versus time for the measurements collected from each of the PNS, Pintake, Pplane, PNA, Pfluid, and Qfuel sensors. As indicated by the circles 870a,b, the flow booster is activated at time t=0.4 to reduce the pressure (Pfluid) from about 100 psi (7.03 Kg/cm2) to 80 about psi (5.63 Kg/cm2), and at time t=0.6 to reduce the pressure (Pfluid) from 80 (5.63 Kg/cm2) psi to 60 psi (4.22 Kg/cm2). This results in controlling the pressures measured by each of the PNS, Pintake, Pplane, PNA, Pfluid, and Qfuel sensors. As shown by the graph 800a, the pressurized fluid (Pfluid) may be used to provide a flow boost to control the actual nozzle pressure (PNA) as well as other pressures of the refueling system. This control may be used to maintain the PNA below the Pmax.

The graph 800b plots flow rate (Q) (Y axis) versus PNA (X axis) using the measurements taken at during the closure test of FIG. 8A to generate a flow booster line 800a'. The graph 800b also shows the graph of 700a of FIG. 7 for comparison. As indicated by the dashed triangle 872, the flow rate of the fuel with the pressurized boost increases the flow rate (Qfuel) to a rate closer to the maximum pressure (Pmax) of 50 psi (3.52 Kg/cm2). The graph 800b also shows that the PNA for the flow boost 800a' fell within a range of R1 of 80% for more than 50% of the time, but the PNA without flow boost of the graph 700a was within the range R1 for less than 10% of the time.

The graphs 800a,b indicates that the flow boost may be used to increase the actual nozzle pressures (PNA) and/or to manipulate the flow of the fuel (Pfuel). This graph 800b also indicates that the flow boost increases the rate of flow (Qfuel) into the aircraft, thereby reducing the time to fill the fuel tanks in the aircraft. The increased rate of flow (Qfuel) using the flow booster may provide pressure into the fuel circuit, thereby compensating for backpressures that may occur during fueling as demonstrated by the graph 800*a,b*.

Based on the graphs, calculations show that, without boost, at a back pressure of about 25 psi (1.76 Kg/cm2), flow for 5 minutes at 800 liter/min generates about 4000 liters (1056.69 gallons) of uplift. Using the flow booster of FIGS. 8A and 8B, at a backpressure of 25 psi (1.76 Kg/cm2) and flow at about 280 gallons (1059.91 liters) per minute, the volume of 1058 gallons (4004.96 liters) at 280 gallons (1059.91 liters) per minutes fills in about 3.78 minutes. The 3.78 minutes is about a 25% reduction in fueling time using the flow booster throughout the fueling cycle.

Example 6—Closure Test with Fuel Boost—PSA Comparison

This example is the same as Example 5, except that the flow boost in this version is performed by making a single adjustment to the fluid pressure (Pfluid) with the flow booster activated, and comparing the results with the simulated nozzle pressures (PNS) of FIG. 7B without flow boost. This example 5 also demonstrates the use of flow boost while maintaining the simulated nozzle pressure (PNS) below the maximum pressure (Pmax).

Figure 9A:
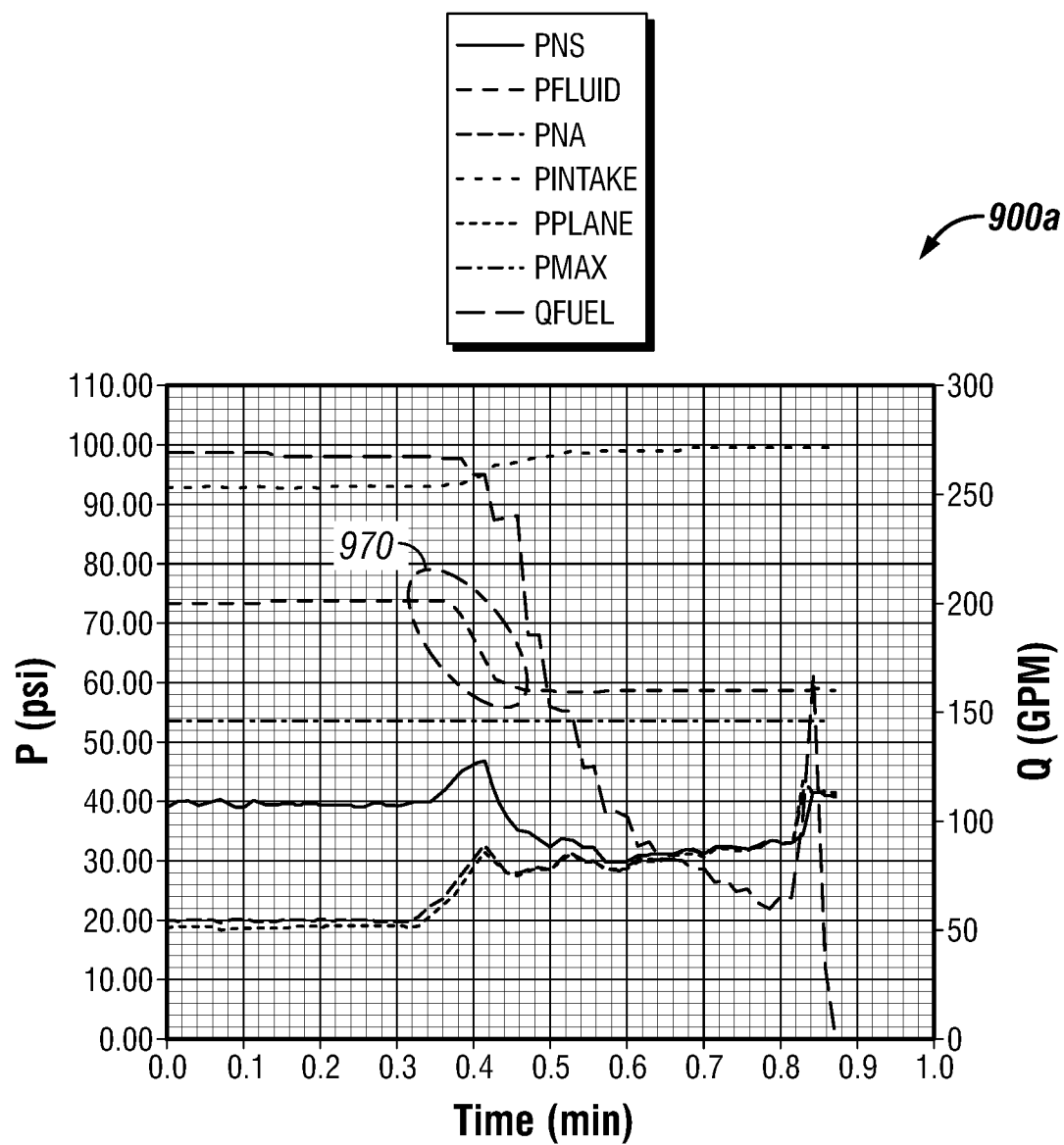
FIG. 9A is a graph depicting another closure test with a single flow boost by the flow booster.
Figure 9B:
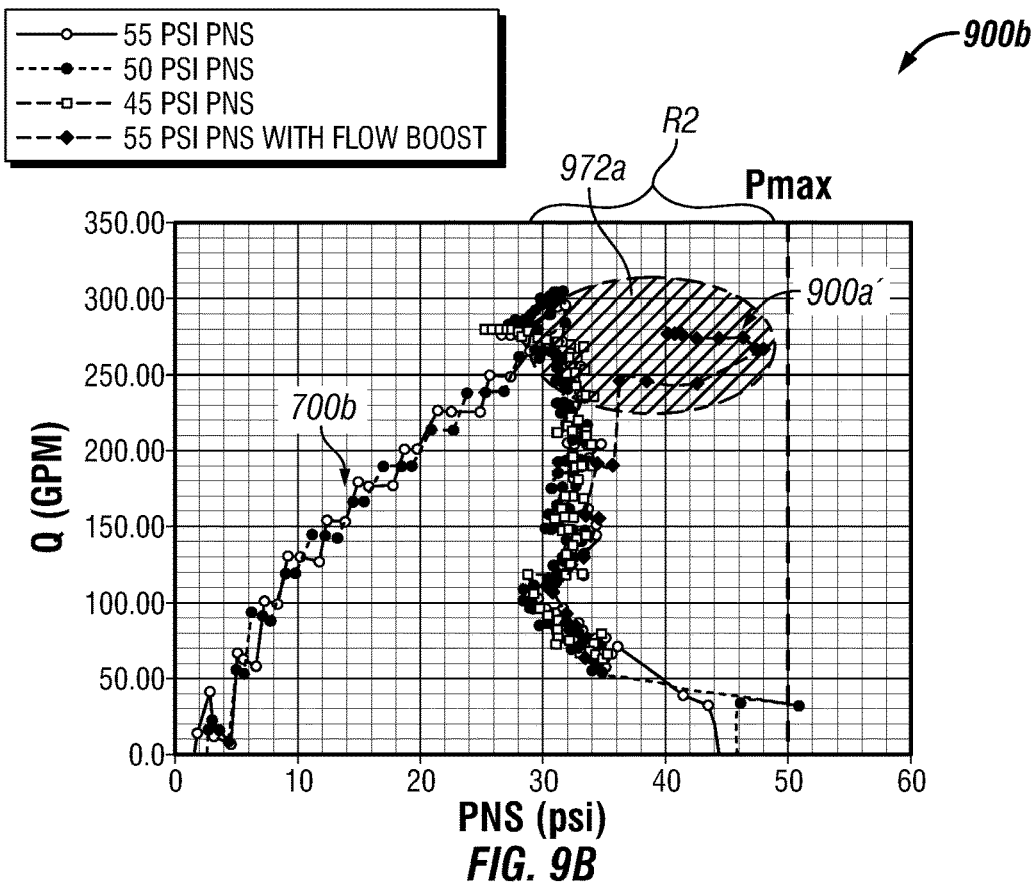
FIG. 9B is a graph comparing the closure tests of FIGS. 7B and 9A.
Figure 9C:
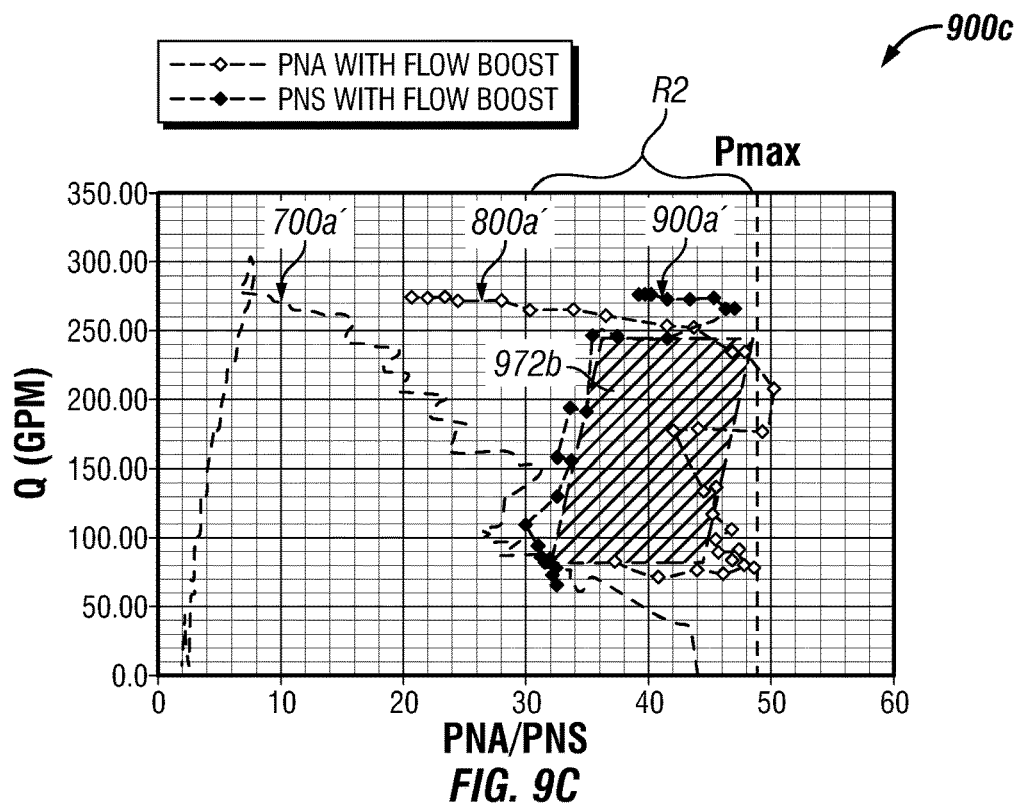
FIG. 9C is a graph comparing the closure test of FIGS. 7A, 8A, and 9A.

FIGS. 9A-9C are graphs 900*a-c* depicting measurements taken during the closure test with the flow booster activated. The graph 900*a* plots pressure (P) (Y1) and flow rate (Q) (Y2) versus time for the measurements collected from each of the PNS, Pintake, Pplane, PNA, Pfluid, and Qfuel sensors. As indicated by the dashed circle 970, the flow booster is activated at time t=0.4 to reduce the pressure (Pfluid) from 75 psi (5.27 Kg/cm2) to 60 psi (4.22 Kg/cm2).

As shown by the graph 900*a*, the pressurized fluid (Pfluid) may be used to provide a flow boost to increase the simulated nozzle pressure (PNS) as well as other pressures of the refueling system and/or to manipulate the flow of the fuel (Pfluid). This flow boost results in corresponding increases in the pressures measured by each of the PNS, Pintake, Pplane, PNA, Pfluid, and Qfuel sensors, and the fuel pressure from exceeding the maximum pressure (Pmax).

The graph 900*b* plots flow rate (Q) (Y axis) versus PNS (X axis) using the measurements taken at during the closure test shown in graph 900*a* of FIG. 9A to generate a flow booster line 900*a'*. The graph 900*b* also shows the graph of 700*b* for comparison. As indicated by the dashed circle 972*a*, the flow rate of the fuel with the pressurized boost increases the flow rate (Qfuel) to a rate closer to the maximum pressure (Pmax) of 50 psi (3.52 Kg/cm2). This graph 900*b* also indicates that the flow boost increases the rate of flow into the aircraft, thereby reducing the time to fill the fuel tanks in the aircraft while maintaining the fuel pressure below the maximum pressure (Pmax). The graph 900*b* also shows that the PNS for the flow boost 900*a'* fell within a range of R2 of 60% for about 100% of the time and the PNA fell within R2 for about 90% of the time, but the PNA without flow boost of the graph 700*b* was within the range R2 for less than about 30% of the time.

The graph 900*c* plots flow rate (Y axis) versus PNS/PNA (X axis) using the measurements taken during the closure tests shown in line 800*a'* of FIG. 8A and 900*a'* of FIG. 9A. The graph 900*b* also shows the graph of 700*a'* for comparison. The graph 700*a'* is an average of the points on graph 700*a* of FIG. 7. As indicated by the dashed parallelogram 972*b*, the flow rate of the fuel with the pressurized boost increases the flow rate (Qfuel) to a rate closer to the maximum pressure (Pmax) of 50 psi (3.52 Kg/cm2) from the simulated and the actual nozzle pressures (PNS/PNA).

The graph 900*b* indicates that the PNA for the flow boost 800*a'* and 1000*a'* fell within a range of R3 of 60% for about 70% of the time, but the PNA without flow boost of the graph 700*b* was within the range R3 for less than about 10% of the time. This graph 900*c* also shows the difference in flow booster performance while monitoring PNS versus PNA.

Example 7—Closure Test with 45 psi (3.16 Kg/cm2) Nozzle—PNS and PSA Comparison

Figure 10A:
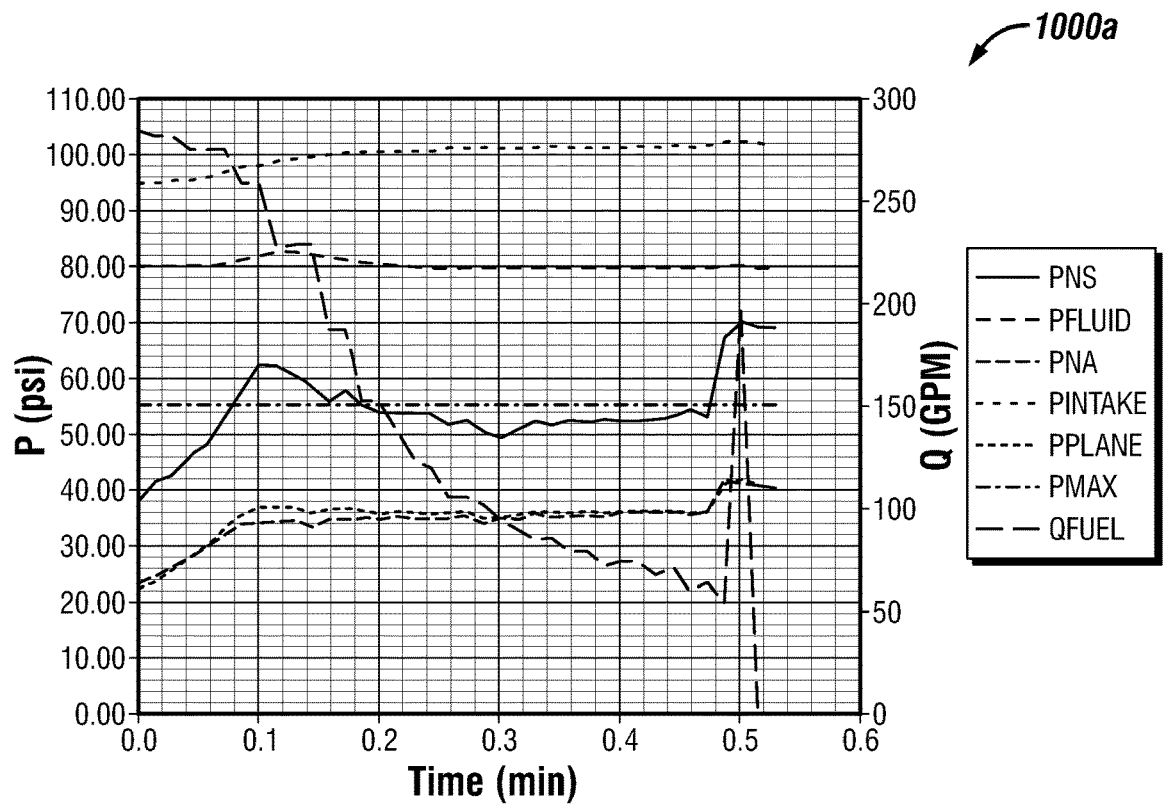
FIG. 10A is a graph depicting another closure test with a tuned flow boost.
Figure 10B:
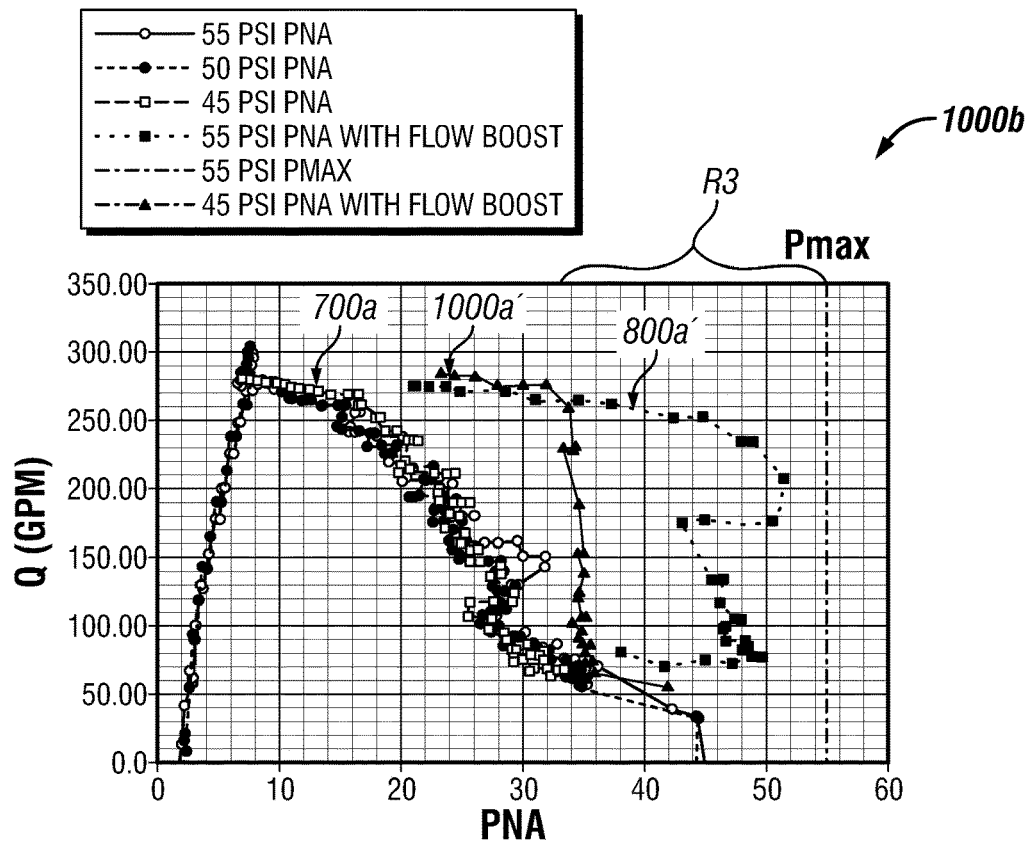
FIG. 10B is a graph comparing the closure tests of FIGS. 7A, 8A and FIG. 10A.

This a closure test similar to the Example 3 of FIG. 6A, except that this closure test is performed without boost using a different nozzle at 45 psi (3.16 Kg/cm2) and at 80 psi (5.63 Kg/cm2) fluid pressure. FIGS. 10A-10B are graphs 1000*a-b* depicting measurements taken during the closure test without the flow booster activated at a constant pressure. The graph 1000*a* plots pressure (P) (Y1) and flow rate (Q) (Y2) versus time for the measurements collected from each of the PNS, Pintake, Pplane, PNA, Pfluid, and Qfuel sensors.

As shown by the graph 1000*a*, the constant, increased fluid pressured (Pfluid) at 80 psi (5.63 Kg/cm2) provides a constant boost with a matched nozzle at 45 psi (3.16 Kg/cm2) providing control to maintain pressures below the maximum pressure (Pmax). The graph 1000*a* indicates that this constant flow boost above the standard air pressure setting may be used to maintain the simulated nozzle pressure (PNS) and/or the flow of the fuel (Pfluid) near the maximum pressure (Pmax).

The graph 1000*b* plots flow rate (Q) (Y axis) versus PNS (X axis) using the measurements taken at during the closure test shown in graph 1000*a* of FIG. 10A to generate a flow booster line 1000*a'*. The graph 1000*b* also shows the graphs 700*a* of FIGS. 7 and 800*a'* of FIG. 8 for comparison. As indicated by graphs the flow booster may be used to increase (Qfuel) during operation and/or to maintain the pressures (PNS/PNA) below the maximum pressure (Pmax).

Figure 11:
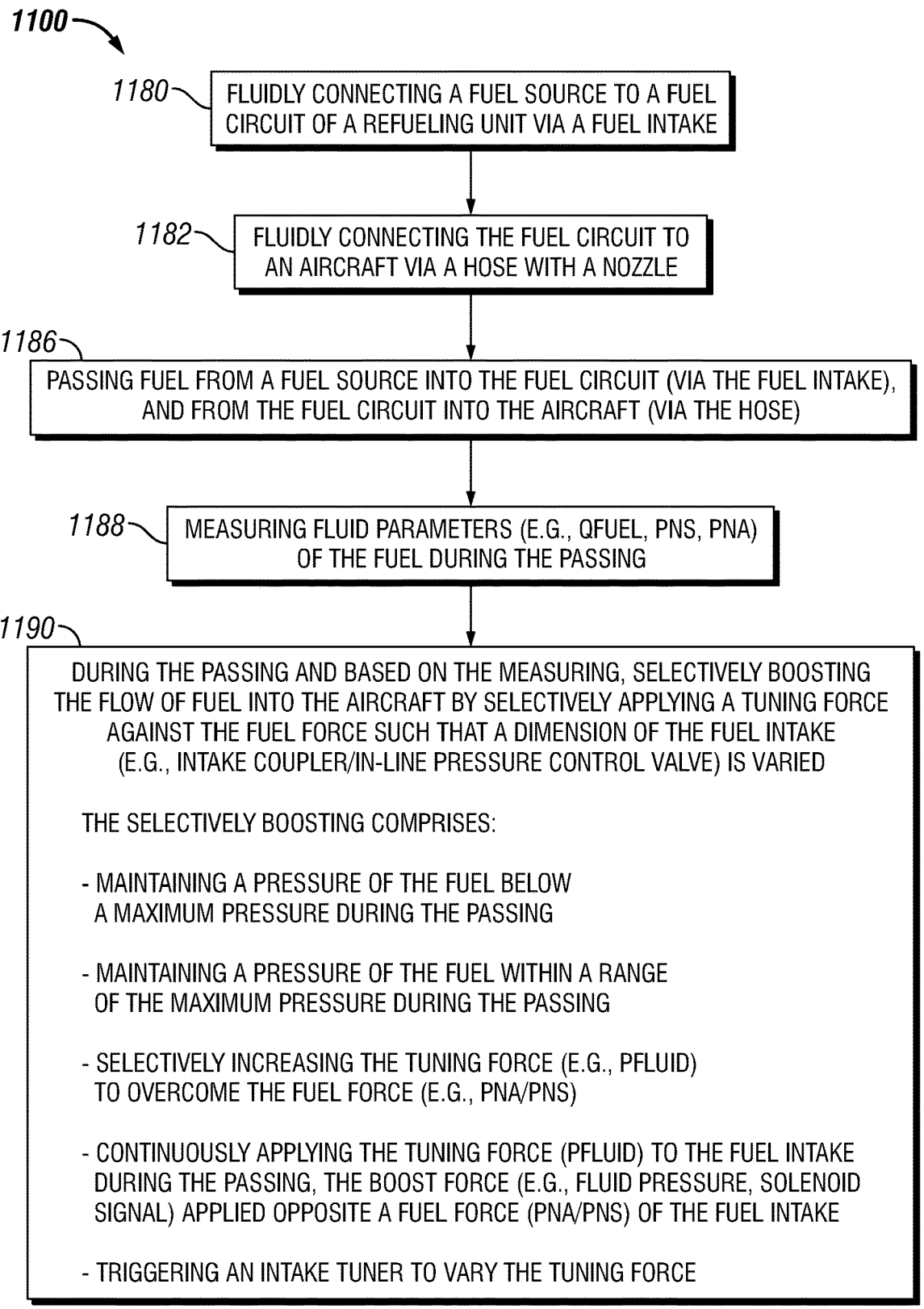
FIG. 11 is a flow chart depicting a method of optimizing the flow of fuel to an aircraft.

FIG. 11 is a flow chart depicting a method 1100 of optimizing flow of fuel into an aircraft. The method involves 1180-fluidly connecting a fuel source to a fuel circuit of a refueling unit via a fuel intake and 1182-fluidly connecting the fuel circuit to an aircraft via a hose with a nozzle. The refueling unit comprises a fuel circuit, a flow booster, and a hose. The method continues with 1186-passing fuel from a fuel source into the fuel circuit (via the fuel intake), and from the fuel circuit into the aircraft (via the hose), 1188-measuring fluid parameters (e.g., Qfuel, PNS, PNA) of the fuel during the passing, and 1190-during the passing and based on the measuring, selectively boosting the flow of fuel into the aircraft by selectively applying a tuning force against the fuel force such that a dimension of the fuel intake (e.g., intake coupler/in-line pressure control valve) is varied.

The selectively boosting may involve maintaining a pressure of the fuel below a maximum pressure during the passing, maintaining a pressure of the fuel within a range of the maximum pressure during the passing, selectively increasing the tuning force (e.g., Pfluid) to overcome the fuel force (e.g., PNA/PNS), continuously applying the tuning force (Pfluid) to the fuel intake during the passing, the boost force (e.g., fluid pressure, solenoid signal) applied opposite a fuel force (PNA/PNS) of the fuel intake, and/or triggering an intake tuner to vary the tuning force.

These and other methods may be performed. Part or all of the method may be performed in any order and/or combined as needed.

While the embodiments are described with reference to various implementations and exploitations, it will be understood that these embodiments are illustrative and that the scope of the inventive subject matter is not limited to them. Many variations, modifications, additions and improvements are possible. For example, various combinations of one or more of the features provided herein may be used.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

Insofar as the description above and the accompanying drawings disclose any additional subject matter that is not within the scope of the claim(s) herein, the inventions are not dedicated to the public and the right to file one or more applications to claim such additional invention is reserved. Although a very narrow claim may be presented herein, it should be recognized the scope of this invention is much broader than presented by the claim(s). Broader claims may be submitted in an application claims the benefit of priority from this application.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A flow booster for optimizing flow of a fuel passing into an aircraft via a refueling unit, the refueling unit comprising a fuel circuit, the flow booster comprising:
a fuel intake fluidly coupled to the fuel circuit, the fuel intake comprising a housing having a fluid chamber and a fuel chamber, and a piston, the piston comprising a piston rod connecting a piston head in the fluid chamber to a piston tail in fuel chamber, the piston slidably movable in the housing to define a variable fuel inlet to receive the fuel therethrough and into the fuel circuit, wherein the fuel chamber is in fluid communication with the fuel and the fluid chamber is in fluid communication with a pressurized fluid source, so that a fuel pressure of the fuel has a fuel force applied to the piston tail in the fuel chamber;
an intake tuner operatively connected to the fuel intake, the intake tuner having a tuning force applied by a fluid pressure of the pressurized fluid source to the piston head in the fluid chamber against the fuel force;
a trigger coupled to the intake tuner to selectively vary the tuning force applied by the intake tuner; and
a flow regulator coupled to sensors positioned about the refueling unit to receive fuel measurements therefrom, the flow regulator operatively connected to the trigger to selectively activate the trigger in response to the fuel measurements whereby the flow of the fuel into the aircraft is continuously adjustable during refueling.

2. The flow booster of claim 1, wherein the piston is urged toward a fully closed position of the fuel inlet when the tuning force exceeds the fuel force and toward a fully open position of the fuel inlet when the fuel force exceeds the tuning force.

3. The flow booster of claim 1, wherein the fuel force is defined by a fuel pressure of the fuel at one of: the fuel inlet, the fuel circuit, the aircraft, and combinations thereof.

4. The flow booster of claim 1, wherein the trigger comprises one of driver, a solenoid, a valve, and combinations thereof.

5. The flow booster of claim 1, wherein the fuel measurements comprise a fuel pressure, and wherein the flow regulator has a minimum trigger level for activation of the trigger, the minimum trigger level corresponding to a fuel pressure of 75% of a predefined maximum fuel pressure.

6. A refueling system for optimizing flow of a fuel passing into an aircraft, the refueling system comprising:
a fuel source;
a refueling unit comprising a fuel circuit in selective fluid communication with the fuel source and the aircraft; and
a flow booster, comprising:
a fuel intake fluidly coupled to the fuel circuit, the fuel intake comprising a housing having a fluid chamber and a fuel chamber, and a piston, the piston comprising a piston rod connecting a piston head in the fluid chamber to a piston tail in fuel chamber, the piston slidably movable in the housing to define a variable fuel inlet to receive the fuel therethrough and into the fuel circuit, wherein the fuel chamber is in fluid communication with the fuel and the fluid chamber is in fluid communication with a pressurized fluid source, so that a fuel pressure of the fuel has a fuel force applied to the piston tail in the fuel chamber;
an intake tuner operatively connected to the fuel intake, the intake tuner having a tuning force applied by a fluid pressure of the pressurized fluid source to the piston bead in the fluid chamber against the fuel force;
a trigger coupled to the intake tuner to selectively vary the tuning force applied by the intake tuner; and
a flow regulator coupled to sensors positioned about the refueling unit to receive fuel measurements therefrom, the flow regulator operatively connected to the trigger to selectively activate the trigger in response to the fuel measurements whereby the flow of the fuel into the aircraft is continuously adjustable during refueling.

7. The refueling system of claim 6, wherein the sensors comprise a fluid pressure (Pfluid) sensor, a fuel pressure (Pfuel) sensor, an intake pressure (Pintake) sensor, a fuel flow rate (Qfuel) sensor, a simulated nozzle pressure (PNS) sensor, an actual nozzle pressure (PNA) sensor, and a backpressure at the aircraft (Pplane) sensor.

8. A method of optimizing flow of a fuel into an aircraft by continuously adjusting a flow of the fuel entering the aircraft in real time via a refueling unit, the method comprising:
passing the fuel through a fuel intake and into a fuel circuit and from the fuel circuit into the aircraft;
defining a dimension of a fuel inlet of the fuel intake by slidably positioning a piston in the fuel inlet and applying a fuel force of the fuel to the piston;
measuring fuel parameters of the fuel during the passing, wherein measuring the fuel parameters comprises at least one of:
capturing a nozzle pressure measured at a nozzle coupled with the aircraft, and capturing a stimulated nozzle pressure measured at the fuel circuit; and selectively boosting the flow of the fuel into the aircraft by selectively applying a tuning force in response to a measured fuel parameter resulting in:
- an increase to a value of one or more of the fuel parameters,
- an increase in a flow rate of fuel entering the aircraft, and
- compensation of a backpressure with the refueling unit.

9. The method of claim 8, wherein the selectively boosting comprises maintaining a pressure of the fuel below a maximum pressure during the passing.

10. The method of claim 8, wherein the selectively boosting comprises selectively increasing the tuning force to overcome the fuel force.

11. The method of claim 8, wherein the fuel parameters comprise a fuel pressure of the fuel and wherein the selectively boosting comprises maintaining the fuel pressure within 75% of a predefined maximum pressure for more than 50% of the passing.

* * * * *

UNITED STATES PATENT AND TRADEMARK OFFICE
CERTIFICATE OF CORRECTION

| | | |
|---|---|---|
| PATENT NO. | : 12,030,667 B2 | |
| APPLICATION NO. | : 16/961444 | |
| DATED | : July 9, 2024 | |
| INVENTOR(S) | : Bernhard Hans Maedler et al. | |

It is certified that error appears in the above-identified patent and that said Letters Patent is hereby corrected as shown below:

On the Title Page

Item (57), in Column 2, in "Abstract", Line 5, delete "h a" and insert -- a --.

Item (57), in Column 2, in "Abstract", Line 7, delete "fuel M" and insert -- fuel --.

In the Specification

In Column 1, Line 41, delete "Nos." and insert -- Nos. 2011/0232801, --.

In the Claims

In Column 16, Line 39, in Claim 6, delete "bead in" and insert -- head in --.

Signed and Sealed this
Fifteenth Day of October, 2024

Katherine Kelly Vidal
*Director of the United States Patent and Trademark Office*